(12) United States Patent
Roberts

(10) Patent No.: US 10,876,513 B2
(45) Date of Patent: Dec. 29, 2020

(54) TURBINE ASSEMBLY

(71) Applicant: VERDERG LTD, Kingston upon Thames (GB)

(72) Inventor: Peter Roberts, Kingston upon Thames (GB)

(73) Assignee: VERDERG LTD, Kingston upon Thames (GB)

( * ) Notice: Subject to any disclaimer, the term of this patent is extended or adjusted under 35 U.S.C. 154(b) by 646 days.

(21) Appl. No.: 15/301,701

(22) PCT Filed: Apr. 2, 2015

(86) PCT No.: PCT/GB2015/051035
§ 371 (c)(1),
(2) Date: Oct. 3, 2016

(87) PCT Pub. No.: WO2015/150819
PCT Pub. Date: Oct. 8, 2015

(65) Prior Publication Data
US 2017/0184069 A1    Jun. 29, 2017

(30) Foreign Application Priority Data

Apr. 2, 2014 (GB) .................................. 1405946.3

(51) Int. Cl.
*F03B 13/10* (2006.01)
*F03B 13/12* (2006.01)
(Continued)

(52) U.S. Cl.
CPC ............... *F03B 13/10* (2013.01); *F03B 1/02* (2013.01); *F03B 1/04* (2013.01); *F03B 11/063* (2013.01);
(Continued)

(58) Field of Classification Search
CPC .... F03B 1/04; F03B 1/02; F03B 11/02; F03B 13/08; F03B 17/061; F03B 13/10;
(Continued)

(56) References Cited

U.S. PATENT DOCUMENTS 1,362,304 A * 12/1920 Harza ................... F03B 13/083
290/52
1,397,704 A * 11/1921 Rockwood ........... A62C 35/645
169/21
(Continued)

FOREIGN PATENT DOCUMENTS

CA    1 144 381        4/1983
CA    2 366 043 A1     6/2003
(Continued)

OTHER PUBLICATIONS

Machine Translation of EP2568161A1 (IDS Reference) (Year: 2011).*
(Continued)

*Primary Examiner* — Moshe Wilensky
*Assistant Examiner* — Brian Christopher Delrue
(74) *Attorney, Agent, or Firm* — Seed Intellectual Property Law Group LLP

(57) ABSTRACT

An apparatus for generating electricity from water flow held behind a barrier includes a convergent section connected to a first end of a mixing tube such that a venturi is defined between the end of the convergent section and the mixing tube; a diffuser section connected to a second end of the mixing tube, the diffuser section configured such that the pressure at the exit of the diffuser section is greater than the pressure at the venturi; and a turbine tube comprising a blade assembly having a plurality of blades. The turbine tube is supported in the convergent section and is rotatably mounted, the blades being attached to the inner surface of
(Continued)

turbine tube such that water flow past the blades drives the rotation of the turbine tube.

28 Claims, 15 Drawing Sheets

(51) Int. Cl.
| | | |
|---|---|---|
| | *F03B 13/14* | (2006.01) |
| | *F03B 17/06* | (2006.01) |
| | *F03B 13/08* | (2006.01) |
| | *F03B 1/02* | (2006.01) |
| | *F03B 1/04* | (2006.01) |
| | *F03B 11/06* | (2006.01) |
| | *F03B 11/02* | (2006.01) |

(52) U.S. Cl.
CPC .............. *F03B 13/08* (2013.01); *F03B 13/12* (2013.01); *F03B 13/14* (2013.01); *F03B 17/061* (2013.01); *F03B 11/02* (2013.01); *F05B 2220/32* (2013.01); *F05B 2220/706* (2013.01); *F05B 2220/7066* (2013.01); *F05B 2220/7068* (2013.01); *F05B 2240/122* (2013.01); *F05B 2240/123* (2013.01); *F05B 2240/133* (2013.01); *F05B 2240/60* (2013.01); *F05B 2260/4031* (2013.01); *Y02E 10/20* (2013.01)

(58) Field of Classification Search
CPC ...... F03B 13/105; F03B 17/06; F03B 13/264; F03B 13/12; F03B 13/14; F03B 13/26; F03B 13/262; F05B 2220/32; F05B 2220/706; F05B 2220/7066; F05B 2220/7068; F05B 2240/122; F05B 2240/123; F05B 2240/133; F05B 2240/60; F05B 2260/4031; Y02E 10/22; Y02E 10/28; Y02E 10/223; Y02E 10/226
See application file for complete search history.

(56) References Cited

U.S. PATENT DOCUMENTS

| | | | | | |
|---|---|---|---|---|---|
| 1,485,186 | A | * | 2/1924 | Harza | F03B 13/083 |
| | | | | | 290/52 |
| 1,493,154 | A | * | 5/1924 | Harza | F03B 11/02 |
| | | | | | 290/52 |
| 1,499,589 | A | * | 7/1924 | Navin | E21B 43/121 |
| | | | | | 166/265 |
| 1,502,879 | A | * | 7/1924 | Rockwood | A62C 35/645 |
| | | | | | 169/17 |
| 1,562,556 | A | * | 11/1925 | Harza | F03B 11/06 |
| | | | | | 290/52 |
| 1,567,050 | A | * | 12/1925 | Grieshaber | B63G 8/22 |
| | | | | | 114/333 |
| 1,929,098 | A | * | 10/1933 | Moody | F03B 3/121 |
| | | | | | 415/164 |
| 1,947,808 | A | * | 2/1934 | Spellman | F03B 15/14 |
| | | | | | 290/52 |
| 1,958,325 | A | * | 5/1934 | Veatch | B03D 1/04 |
| | | | | | 209/170 |
| 2,007,488 | A | * | 7/1935 | Voss | B67D 1/08 |
| | | | | | 137/207.5 |
| 2,361,949 | A | * | 11/1944 | Langdon | B63G 8/32 |
| | | | | | 114/317 |
| 2,376,536 | A | | 5/1945 | Gonzer | |
| 2,436,683 | A | * | 2/1948 | Wood, Jr. | H02K 5/128 |
| | | | | | 290/43 |
| 2,714,080 | A | * | 7/1955 | De Wald | B05B 3/007 |
| | | | | | 134/181 |
| 2,929,937 | A | * | 3/1960 | Kroger | F03B 3/04 |
| | | | | | 290/52 |
| 2,937,065 | A | * | 5/1960 | Camphausen | E01C 11/106 |
| | | | | | 24/DIG. 51 |
| 2,971,334 | A | * | 2/1961 | Carlson | F02C 3/06 |
| | | | | | 415/126 |
| 2,992,531 | A | * | 7/1961 | Hershey | F23D 17/00 |
| | | | | | 431/153 |
| 3,817,267 | A | * | 6/1974 | Hicks | F16K 31/58 |
| | | | | | 137/204 |
| 3,931,707 | A | * | 1/1976 | Vdoviak | F23R 3/20 |
| | | | | | 60/765 |
| 3,980,894 | A | * | 9/1976 | Vary | F03B 13/105 |
| | | | | | 290/54 |
| 3,988,592 | A | * | 10/1976 | Porter | F03B 13/10 |
| | | | | | 290/53 |
| 4,021,135 | A | | 5/1977 | Pedersen et al. | |
| 4,078,388 | A | * | 3/1978 | Atencio | E02B 9/00 |
| | | | | | 290/53 |
| 4,152,895 | A | * | 5/1979 | Wirt | F03B 13/141 |
| | | | | | 60/398 |
| 4,159,188 | A | * | 6/1979 | Atencio | F03B 13/08 |
| | | | | | 290/53 |
| 4,166,596 | A | | 9/1979 | Mouton, Jr. et al. | |
| 4,179,886 | A | * | 12/1979 | Tsubota | F03B 13/184 |
| | | | | | 415/3.1 |
| 4,182,123 | A | * | 1/1980 | Ueda | F03B 13/086 |
| | | | | | 137/123 |
| 4,204,799 | A | | 5/1980 | de Geus | |
| 4,208,873 | A | | 6/1980 | Foglia | |
| 4,261,171 | A | * | 4/1981 | Atencio | F03B 13/10 |
| | | | | | 290/53 |
| 4,272,685 | A | | 6/1981 | Toyama | |
| 4,275,989 | A | * | 6/1981 | Gutierrez Atencio | F03B 3/103 |
| | | | | | 415/129 |
| 4,279,539 | A | * | 7/1981 | Gutierrez Atencio | E02B 8/06 |
| | | | | | 290/53 |
| 4,289,971 | A | * | 9/1981 | Ueda | F03B 13/08 |
| | | | | | 290/52 |
| 4,320,304 | A | | 3/1982 | Karlsson et al. | |
| 4,475,334 | A | * | 10/1984 | Kuwabara | F03B 15/06 |
| | | | | | 290/43 |
| 4,504,192 | A | | 3/1985 | Cyrus et al. | |
| 4,798,048 | A | * | 1/1989 | Clements | F02K 1/04 |
| | | | | | 60/39.826 |
| 4,960,363 | A | | 10/1990 | Bergstein | |
| 4,998,846 | A | * | 3/1991 | Evstratov | E02B 9/00 |
| | | | | | 290/52 |
| 5,385,015 | A | * | 1/1995 | Clements | F23R 3/20 |
| | | | | | 60/39.826 |
| 5,464,320 | A | | 11/1995 | Finney | |
| 5,709,419 | A | | 1/1998 | Roskey | |
| 5,977,649 | A | | 11/1999 | Dahill | |
| 6,239,506 | B1 | | 5/2001 | Roskey | |
| 6,368,059 | B1 | | 4/2002 | Maines | |
| 6,382,904 | B1 | | 5/2002 | Orlov et al. | |
| 6,437,457 | B2 | | 8/2002 | Roskey | |
| 6,568,181 | B1 | | 5/2003 | Hassard et al. | |
| 6,860,331 | B2 | * | 3/2005 | Hagen | A62C 35/68 |
| | | | | | 169/16 |
| 6,864,597 | B1 | | 3/2005 | Ricker | |
| 6,887,031 | B1 | | 5/2005 | Tocher | |
| 6,967,413 | B2 | | 11/2005 | Atiya | |
| 7,218,011 | B2 | * | 5/2007 | Hiel | F03D 1/04 |
| | | | | | 290/43 |
| 7,471,009 | B2 | * | 12/2008 | Davis | F03B 3/128 |
| | | | | | 290/54 |
| 7,874,788 | B2 | * | 1/2011 | Stothers | F03B 3/04 |
| | | | | | 415/4.5 |
| 8,191,430 | B2 | * | 6/2012 | Roberts | G01N 3/12 |
| | | | | | 73/49.6 |
| 8,446,031 | B2 | * | 5/2013 | Roberts | F03B 13/10 |
| | | | | | 290/53 |
| 8,466,595 | B2 | * | 6/2013 | Spooner | F03B 13/083 |
| | | | | | 310/216.002 |
| 8,754,540 | B2 | * | 6/2014 | Ives | F03B 13/10 |
| | | | | | 290/42 |
| 8,952,559 | B2 | * | 2/2015 | Holstein | F03B 3/18 |
| | | | | | 290/52 |

(56) References Cited

U.S. PATENT DOCUMENTS

| | | | |
|---|---|---|---|
| 8,978,705 B2* | 3/2015 | Marica | F15D 1/02 |
| | | | 138/37 |
| 9,163,485 B2* | 10/2015 | White | E21B 43/013 |
| 9,194,361 B2* | 11/2015 | Roberts | F03B 13/08 |
| 9,488,155 B2* | 11/2016 | Kehr | H02K 7/1823 |
| 9,752,549 B2* | 9/2017 | Roberts | F03B 13/08 |
| 9,752,550 B2* | 9/2017 | Bhende | F03B 13/086 |
| 9,879,862 B2* | 1/2018 | McCormick | F23R 3/52 |
| 10,184,229 B2* | 1/2019 | Kremer | E03B 11/16 |
| 2002/0112465 A1* | 8/2002 | Payling | F01K 21/047 |
| | | | 60/39.53 |
| 2005/0005592 A1* | 1/2005 | Fielder | C02F 1/04 |
| | | | 60/200.1 |
| 2005/0017514 A1 | 1/2005 | Tocher | |
| 2005/0099011 A1 | 5/2005 | Rochester et al. | |
| 2005/0285407 A1* | 12/2005 | Davis | F03B 3/128 |
| | | | 290/54 |
| 2006/0185667 A1* | 8/2006 | Delphia | B63C 11/205 |
| | | | 128/201.11 |
| 2006/0233647 A1* | 10/2006 | Saunders | F01D 5/03 |
| | | | 416/223 A |
| 2007/0006589 A1* | 1/2007 | Muldoon | F23R 3/20 |
| | | | 60/761 |
| 2007/0028621 A1* | 2/2007 | Muldoon | F23R 3/28 |
| | | | 60/761 |
| 2007/0040389 A1 | 2/2007 | Kelley | |
| 2008/0129254 A1 | 6/2008 | Frayne | |
| 2008/0232957 A1 | 9/2008 | Presz et al. | |
| 2008/0238105 A1* | 10/2008 | Ortiz | B60K 6/485 |
| | | | 290/54 |
| 2009/0140525 A1* | 6/2009 | Deangeles | F03B 17/04 |
| | | | 290/54 |
| 2009/0155074 A1 | 6/2009 | Sankar | |
| 2009/0236858 A1 | 9/2009 | Johnson | |
| 2009/0243300 A1* | 10/2009 | Davis | F03B 3/128 |
| | | | 290/54 |
| 2009/0302612 A1 | 12/2009 | Gartner | |
| 2010/0007152 A1 | 1/2010 | Roskey | |
| 2010/0038913 A1* | 2/2010 | Svelund | F03B 13/1815 |
| | | | 290/53 |
| 2010/0126177 A1* | 5/2010 | Hautman | F02K 3/10 |
| | | | 60/752 |
| 2010/0158705 A1* | 6/2010 | Guinard | F03B 13/10 |
| | | | 417/53 |
| 2010/0201132 A1 | 8/2010 | Ivanovich | |
| 2010/0213720 A1 | 8/2010 | Bailey et al. | |
| 2010/0225117 A1* | 9/2010 | DeAngeles | F03B 17/04 |
| | | | 290/54 |
| 2010/0258449 A1* | 10/2010 | Fielder | C02F 1/04 |
| | | | 205/628 |
| 2010/0283251 A1 | 11/2010 | Reynolds | |
| 2010/0289268 A1* | 11/2010 | Schiller | F03B 13/264 |
| | | | 290/54 |
| 2011/0049896 A1 | 3/2011 | Burger et al. | |
| 2011/0110797 A1* | 5/2011 | Cho | F03B 13/10 |
| | | | 417/65 |
| 2013/0088014 A1* | 4/2013 | Holstein | F03B 3/18 |
| | | | 290/54 |
| 2013/0230380 A1* | 9/2013 | Allouche | F01D 5/03 |
| | | | 415/1 |
| 2013/0341930 A1* | 12/2013 | Campagna | F03B 3/04 |
| | | | 290/54 |
| 2015/0047962 A1* | 2/2015 | Trautmann | B01J 8/082 |
| | | | 201/19 |
| 2015/0246372 A1* | 9/2015 | Houston | B09C 1/00 |
| | | | 239/8 |
| 2016/0251964 A1* | 9/2016 | Solorzano | F03D 1/025 |
| | | | 415/121.3 |
| 2017/0167301 A1* | 6/2017 | Fandrei, II | B23K 26/0006 |
| 2017/0328205 A1* | 11/2017 | Gillengerten | F03B 3/06 |

FOREIGN PATENT DOCUMENTS

| | | | | |
|---|---|---|---|---|
| CN | 101952584 | A | | 1/2011 |
| CN | 204003043 | U | * | 12/2014 |
| DE | 35 42 096 | A1 | | 10/1987 |
| DE | 38 13 958 | A1 | | 11/1989 |
| DE | 41 05 499 | A1 | | 8/1992 |
| DE | 10 2005 040 805 | A1 | | 3/2007 |
| DE | 102005040805 | A1 | * | 3/2007 ... F03B 13/10 |
| DE | 10 2010 018 892 | A1 | | 11/2011 |
| EP | 0 931 931 | A1 | | 7/1999 |
| EP | 0 977 343 | A1 | | 2/2000 |
| EP | 2 189 653 | A1 | | 5/2010 |
| EP | 2 568 161 | A1 | | 3/2013 |
| FR | 891 697 | | | 3/1944 |
| FR | 923.131 | | | 6/1947 |
| FR | 2 470 195 | A1 | | 5/1981 |
| FR | 2 497 877 | A2 | | 7/1982 |
| FR | 2 792 661 | A1 | | 10/2000 |
| GB | 305705 | A | * | 2/1929 ... F16K 31/363 |
| GB | 1 381 295 | | | 1/1975 |
| GB | 2 001 396 | A | | 1/1979 |
| GB | 2 224 059 | A | | 4/1990 |
| GB | 2 415 748 | A | | 1/2006 |
| GB | 2 443 195 | A | | 4/2008 |
| GB | 2463504 | A | | 3/2010 |
| GB | 2471349 | A | | 12/2010 |
| GB | 2478743 | A | | 9/2011 |
| GB | 2479367 | A | | 10/2011 |
| GB | 2503250 | A | | 12/2013 |
| JP | 2005-520985 | A | | 7/2005 |
| JP | 2008-513650 | A | | 5/2008 |
| JP | 2009-545692 | A | | 12/2009 |
| JP | 2012-241702 | A | | 12/2010 |
| KR | 20100046701 | A | * | 5/2010 |
| RU | 2 198 318 | C2 | | 2/2003 |
| RU | 2 345 245 | C1 | | 1/2009 |
| RU | 2 370 660 | C1 | | 10/2009 |
| SU | 1204775 | A | | 1/1986 |
| WO | 98/12433 | A1 | | 3/1998 |
| WO | 0125629 | A1 | | 4/2001 |
| WO | 03/054385 | A1 | | 7/2003 |
| WO | 03/081029 | A1 | | 10/2003 |
| WO | 03/081030 | A1 | | 10/2003 |
| WO | 2005/017349 | A1 | | 2/2005 |
| WO | 2005/075818 | A1 | | 8/2005 |
| WO | 2006/055393 | A2 | | 5/2006 |
| WO | 2008/015047 | A1 | | 2/2008 |
| WO | 2009/009350 | A2 | | 1/2009 |
| WO | 2009/018666 | A1 | | 12/2009 |
| WO | 2010/032026 | A2 | | 3/2010 |
| WO | 2011/114156 | A2 | | 9/2011 |
| WO | 2013/190304 | A1 | | 12/2013 |

OTHER PUBLICATIONS

Machine Translation of DE 3542096 A1 (IDS Reference) (Year: 1987).*
Machine Translation of KR20100046701A (Year: 2008).*
CN204003043U Machine Translation (Year: 2014).*

* cited by examiner

TURBINE ASSEMBLY

BACKGROUND

Technical Field

This invention relates to a system and apparatus for use in generating power from a flow of water. In particular the invention relates to a turbine assembly for use in an apparatus for generating power from water flow.

Description of the Related Art

Many systems have been proposed for converting water flow into electricity. One type of device is described in WO2013/190304 which can generate power from a flowing body of water, particularly in situations where there is a high volumetric flow of water at relatively low speeds. This document describes the use of a standard turbine/drive arrangement in the system to generate electricity.

Other turbine arrangements are known to be used in the hydropower industry. One type of turbine is the rim-generation turbines, sometimes called straflo turbines. In straflo turbines the tube is in two halves, an upstream section and a downstream section. The turbine comprises a short cylindrical rim attached to the turbine blades of equal diameter to the turbine tube and positioned between the two stationary tube sections. The blades and rim rotate together with a small clearance between the stationary upstream and downstream sections of the tube and the edges of the rotating turbine rim. The upstream and downstream flow paths are in a stationary tube as the tube is not fixed to the turbine. Sealing the two circumferential gaps between the rim and tube section is difficult. A large gap can cause too much by-pass leakage from the high pressure face of the turbine disc to the downstream low-pressure face of the turbine disc which will dissipate the power generated. While a small gap can cause too much friction from over-tight seals.

The present invention provides an alternative turbine assembly for use in low-head hydropower generation. In particular a turbine assembly that can be used in situations where there is a high volume flow of water at a relatively low pressure head is described, for example for use in systems as described in WO2013/190304.

BRIEF SUMMARY

One aspect of the invention comprises an apparatus for generating electricity from water flow comprising:
- a convergent section connected to a first end of a mixing tube such that a venturi is defined between the end of the convergent section and the mixing tube;
- a diffuser section connected to a second end of the mixing tube, the diffuser section configured such that in use the pressure at the exit of the diffuser section is greater than the pressure at the venturi;
- a turbine tube comprising a blade assembly having a plurality of blades, the turbine tube supported in the convergent section such that an annulus is defined between the turbine tube and the convergent section, to form a first flow passage, and the turbine tube defining a second flow passage, wherein the turbine tube is rotatably supported in the convergent section and the blades are attached to the inner surface of the turbine tube such that in use water flow past the blades drives the rotation of the turbine tube.

The turbine tube and blades rotate relative to the convergent section. The blades are fixedly connected to the inner surface of the turbine tube and extend across the interior diameter of the turbine tube such that the blade assembly and turbine tube rotate concentrically together as water flows past the blades. The turbine tube is not required to comprise a drive shaft extending from the blade assembly along the central axis of the turbine tube to transmit the rotational energy of the turbine tube to an external generator. The blades are connected to the inner surface of the turbine tube such that the blade assembly and turbine tube rotate concentrically together as water flows past the blades. Rotation of the turbine tube can drive a generator. In one embodiment the blade assembly is positioned in the turbine tube, such that part of the secondary flow passage in the turbine tube is provided before and after the blade assembly. In one embodiment the length of the turbine tube can be greater than the diameter of the turbine tube.

The turbine tube is rotatably mounted in a support boss with the support boss mounted in the convergent section by support vanes. The support boss has a central bore formed therethrough to receive and support the turbine tube. The support boss comprises a bearing assembly on which the turbine tube rotates about its longitudinal axis. The interior of the turbine tube may not comprise any mechanical bearings. The bearings being located outside the secondary flow passage.

The support boss can comprise a support tube of shorter length than the turbine tube in which the turbine tube is held. The support boss can further comprises end caps at either end of the support tube, the end caps having bearings on which the turbine tube can rotate.

The turbine tube can comprise a thrust flange that extends circumferentially around the outer surface of the turbine tube. The support boss can comprise a thrust boss which extends circumferentially around the inner surface of the support boss. The thrust flange of the turbine tube can engage with the thrust boss of the support boss. The engagement of the thrust boss and the thrust flange may occur via a bearing assembly.

The turbine tube is freely rotatable to drive a generator and enable the apparatus to generate electrical energy from the rotational energy of the turbine tube. The turbine tube can drive a mechanical generator or an electrical generator for generating power.

In a mechanical generator assembly the turbine tube is connected to a gear train connectable to a generator. In one embodiment the turbine tube comprise a toothed flange on its outer surface which engages with at least one pinion gear located in a space between the support boss and the turbine tube. Each pinion gear is connected to a drive shaft, wherein the drive shaft is connectable to a generator.

The apparatus can comprise a plurality of pinion gear and drive shaft arrangements in the space between the support boss and the turbine tube. In one embodiment the apparatus comprises at least two pinion gear and drive shaft arrangements, each pinion gear engaging the toothed flange. The apparatus may comprise two, three, four or more pinion gear and drive shaft arrangements. The tooth flange extends circumferentially around the turbine tube.

In an electrical generator assembly the turbine tube and support boss comprises a permanent magnet and stator arrangement. In one embodiment the turbine tube comprises permanent magnets in a recess on the outer surface of the turbine tube and the support boss comprise a stator aligned with the permanent magnets. The recess and permanent magnet may extend circumferentially around the outer surface of the turbine tube.

The apparatus can further comprise a power off-take conduit extending through the support boss and one of the support vanes. The drive shaft of a mechanical generator arrangement or the power cable from an electrical generator arrangement can extend through the conduit to outside the apparatus. Having a conduit through the support boss and a support vane means the turbine tube does not comprise any drive shafts and/or power cables in its interior. This enables the first and second flow passages to be devoid of any drive shafts and/or power cables, which can help in reducing disruption to the water flow.

The apparatus can further comprise an air compressor to inject air into the space between the turbine tube and support boss via an air conduit that extends through one of the support vanes. The air compressor can be located externally of the turbine tube and/or convergent section.

The apparatus can further comprise a blower fan located radially about the turbine tube, to draw air into the space between the turbine tube and support boss via an air conduit that extends through one of the support vanes.

In one embodiment a downwardly extending drain conduit extends from the support boss to outside the convergent section through the support vane. The drain conduit provides a passageway for any water that seeps into the space between the turbine tube and support boss.

The support boss can comprise a nose fairing and/or a tail fairing. In one embodiment the outer profile of the nose fairing has a cylindrical profile or a bullet shaped profile. The inner profile of the nose fairing may have a concave, conical or convex shape.

In one embodiment the blades are integral with the inner surface of the turbine tube. In a further embodiment the inner surface of the tube comprises a plurality of recesses in which the tips of the blades are fixed.

The turbine tube can comprise a first section made from a first material and a second section made from a second material, wherein the first material and second material are different. The first material may be a stronger material than the second material. The first section may be the front section of the tube and comprise the blades, and second section may be the back section of the tube.

The internal diameter of the turbine tube can vary. In one embodiment the internal diameter of the turbine tube decreases along its length in the water flow direction. In another embodiment the turbine tube has a substantially constant internal diameter along its length.

The position of the tube can vary relative to the convergent section. The turbine tube is positioned in the convergent section such that the longitudinal axis of the turbine tube is substantially aligned with the longitudinal axis of the convergent section. The turbine tube can be positioned such that entrance of the convergent section is upstream of the entrance of the turbine tube. In a further embodiment the turbine tube can be positioned such that the entrance of the turbine tube is upstream of the entrance of the convergent section.

The position of the exit of the turbine tube can also vary. In one embodiment the turbine tube is positioned such that the exit of the turbine tube extends into the mixing tube. In a further embodiment the turbine tube is positioned such that the exit of the turbine tube is upstream of the entrance of the mixing tube.

The apparatus can further comprise a pre-swirl stator located in the secondary flow passage. The pre swirl stator can be located before the turbine blade assembly in the entrance of the nose fairing or in front of the entrance of the turbine tube.

The convergent section, the mixing tube and the diffuser section can be manufactured as a continuous tube. In a further embodiment the convergent section, the mixing tube and the diffuser section are manufactured as discrete sections connected together to form a continuous tube.

In a preferred embodiment the profile of the convergent section is configured to provide constant acceleration of the primary flow through the annulus. The profile of the diffuser section can be preferably configured to provide constant deceleration of the water flow through the diffuser section.

A further aspect of the invention comprises a system for generating electricity from water flow comprising; a barrier for locating across the cross-section of a flowing body of water; and provided with at least one apparatus as described above, wherein the apparatus is positioned such that in use provides a flow path from the upstream side of the barrier to the downstream side of the barrier.

A further aspect of the invention comprises a method of generating electricity from a flow of water of water, comprising:
   installing a system or apparatus as described above across a body of water to provide a reservoir of water, such that a head difference is created between the upstream and downstream sides of the barrier; and
   using the flow of water through the apparatus to rotate the turbine.

The barrier can comprise at least two apparatuses as described above. Preferably the barrier comprises an array of apparatuses as described above. The apparatuses are incorporated into the barrier to provide a flow path from one side of the barrier to the other.

A further aspect of the invention comprises a turbine assembly for use in a outer tube having a convergent section connected to a first end of the mixing tube such that a venturi is defined between the convergent section and the mixing tube, and divergent section connected to a second end of the mixing tube for generating electricity from water flow, the turbine assembly comprising:
   a turbine tube comprising a blade assembly having a plurality of blades; and
   a support boss, for mounting in the convergent section of the outer tube;
   wherein the turbine tube is rotatably supported in a support boss and the blades are attached to the inner surface of turbine tube such that in use water flow past the blades drives the rotation of the turbine tube. The turbine tube rotates relative to the support boss.

The blades are fixedly connected to the inner surface of the turbine tube such that the blade assembly and turbine tube rotate concentrically together as water flows past the blades.

The support boss has a central bore formed therethrough to receive and support the turbine tube. The support boss comprises a bearing assembly on which the turbine tube rotates about its longitudinal axis. The turbine assembly can have further features of the turbine tube and support boss as described above.

In the following description, the terms "upstream" and "downstream" are used to define relative locations of features of the apparatus. The upstream and downstream directions are defined in relation to the direction which the water flows through the apparatus in use. The upstream end can be considered the input region and the downstream end can be considered the output region.

BRIEF DESCRIPTION OF THE SEVERAL VIEWS OF THE DRAWINGS

The invention will now be described by way of example with reference to the accompanying drawings.

DETAILED DESCRIPTION

Figure 1:
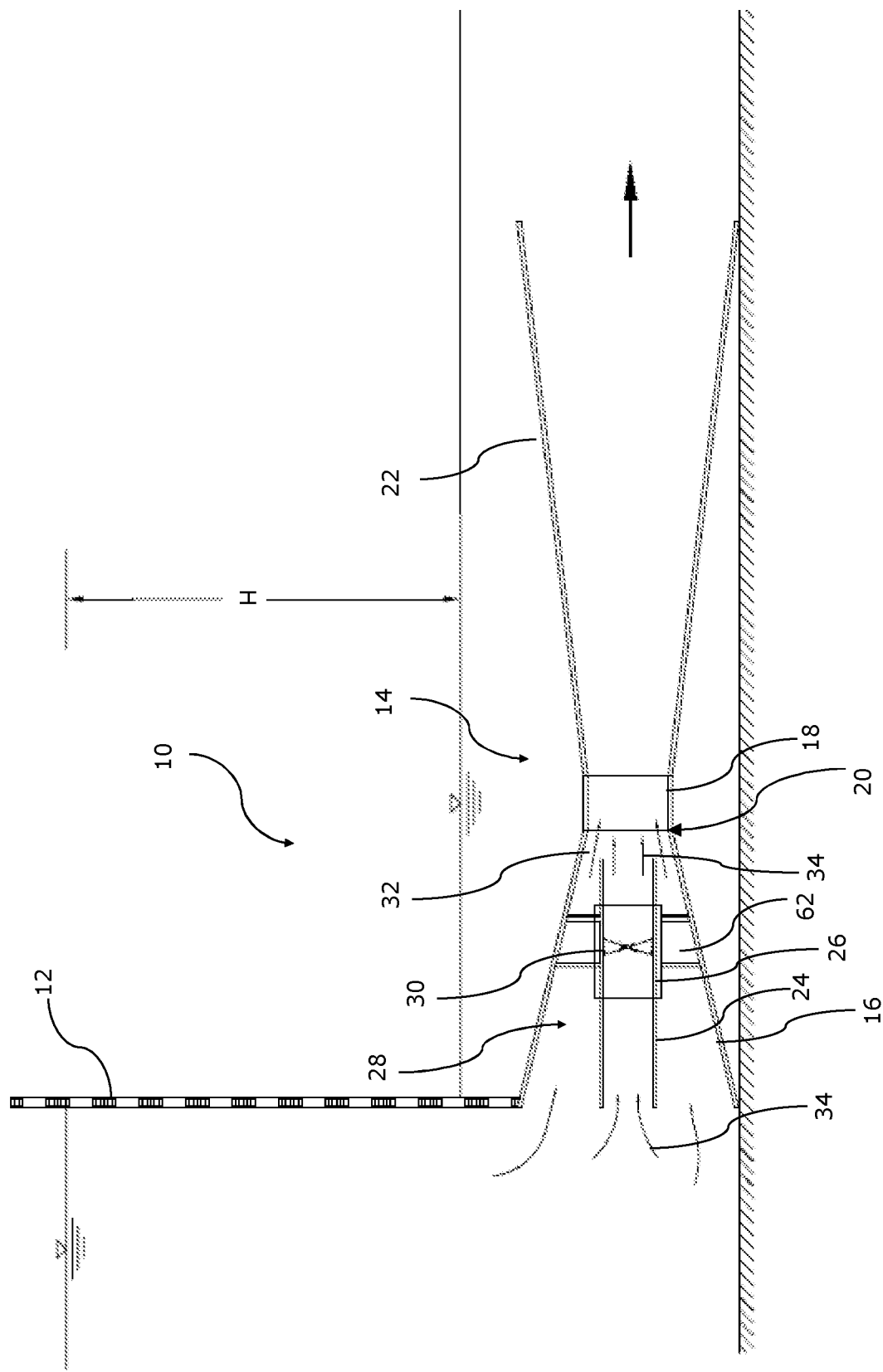
FIG. 1 shows a cross sectional side view of an embodiment of the invention.

FIG. 1 shows a system 10 according to the invention for converting water flow to electricity. The system comprises a barrier 12 positioned across the width of a body of water and an apparatus 14 providing a flow passage for water through the barrier 12 from the upstream side of the barrier to the downstream side of the barrier. The system converts hydraulic flow energy into hydraulic potential energy and then converts the hydraulic potential energy into electrical energy.

The resistance of the system to the flow induces a rise in the upstream water free surface creating an inventory of potential hydraulic energy that drives the flow through the apparatus and from which the turbine extracts mechanical energy for conversion to electricity. The inventory of potential hydraulic energy in the uplifted upstream free surface is continuously replenished by the kinetic energy of the upstream flow.

Figure 2:
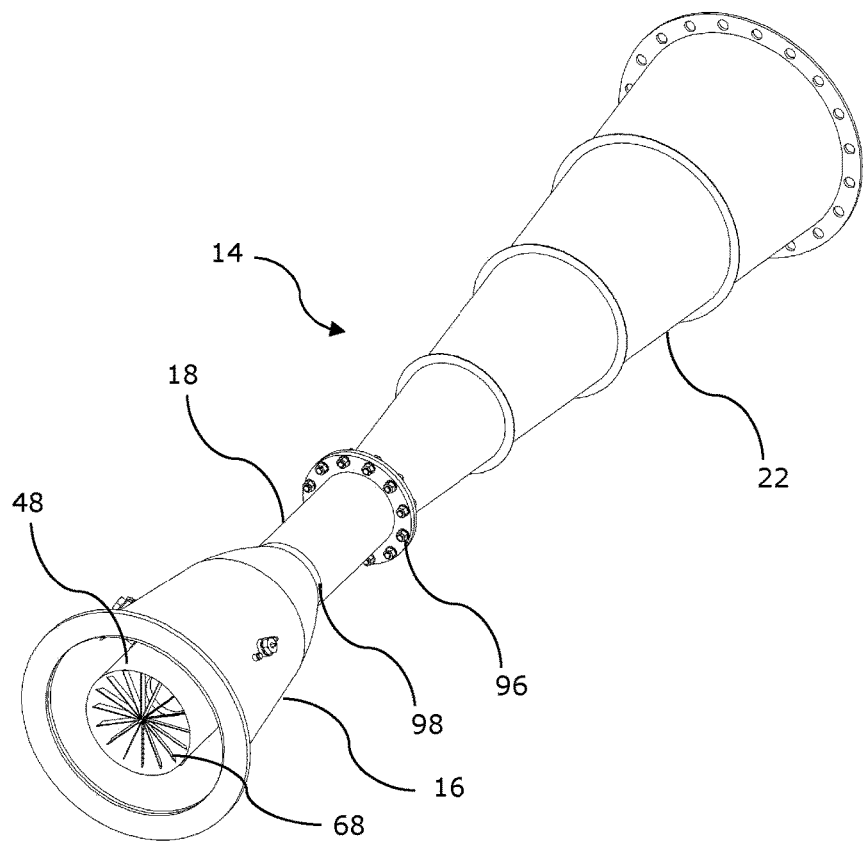
FIG. 2 shows an embodiment of the apparatus of the invention.
Figure 3:
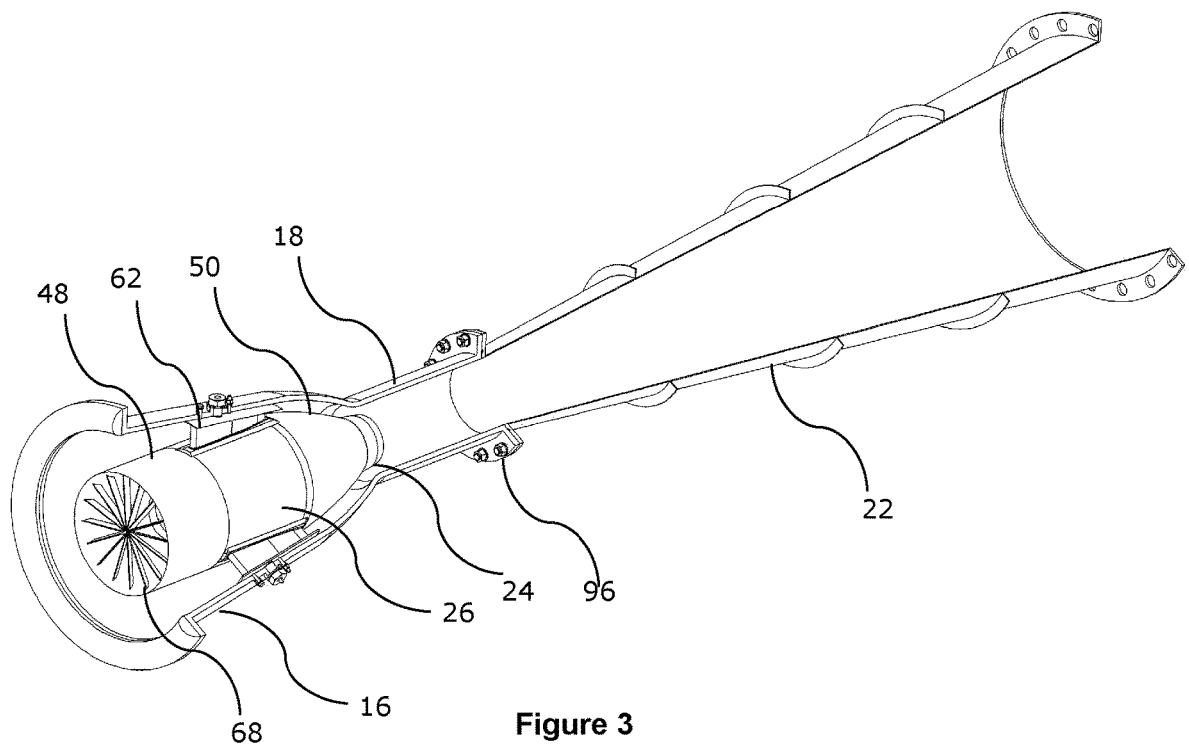
FIG. 3 shows a cut away view of FIG. 2.

With reference to FIGS. 1, 2 and 3 the apparatus 14 provides a flow passage from an upstream location to a location downstream of a barrier 12. The apparatus comprises a tube having a convergent section 16, a mixing section 18 and a divergent diffuser section 22. The convergent section 16 narrows towards the mixing tube 18 such that a venturi 20 is defined at the boundary of the convergent section 16 and the mixing tube 18. A divergent diffuser section 22 extends from the exit of the mixing tube 18.

A turbine tube 24 is rotationally supported within the convergent section 16 in a support boss 26 such that an annulus 28 is formed between the outer surface of the turbine tube 24 and the inner surface of the convergent section 16. The support boss comprises a central bore for receiving and supporting the turbine tube such that longitudinal axis of the turbine tube 24 is substantially aligned with the longitudinal axis of the convergent section 16. The turbine tube comprises a blade assembly 30. As water flows through the turbine tube 24 the blade assembly 30 drives the rotation of the turbine tube 24 relative to the static support boss 26 and the convergent section 16.

A first flow path for the primary flow 32 is defined within the annulus between the turbine tube 24 and the convergent section 16. A second flow path for a secondary flow 34 is defined within the turbine tube 24. The annulus is not restricted to a circular, ring shaped space between the tube and the inner walls of the convergent section. The shape of the annulus will depend on the cross sectional shape of the convergent section, the turbine tube and the support boss.

The barrier 12 across the body of water provides a pressure head immediately upstream of the apparatus. This converts some of the kinetic energy from the flow further upstream into potential energy of the raised water level as the flow slows down as the water depth behind the barrier increases. The resulting head difference (H) permits the conversion of the potential energy into useful energy above the upper output limit, known as the Betz limit, of a free stream device which extracts kinetic energy directly from an equivalent flow. Water from the upstream side of the barrier flows through the convergent section into the mixing section, and then out of the apparatus via the diffuser section. A secondary flow through the tube is induced which drives the rotation of the turbine tube via the blade assembly generating electricity via a mechanical or electrical power off take arrangement.

The convergent section accelerates the primary flow into the low pressure zone at the venturi. The low pressure zone induces the secondary flow through the turbine tube. Both the primary and secondary flows enter the mixing chamber where the two flows mix. The mixed flow enters the diffuser section and the velocity of the water flow slows as it moves through the diffuser section. As the water flows through the diffuser section the flow regains its static head and losses its dynamic head before it exits the diffuser section downstream. This preserves the low static head in the venturi.

The major part, the primary flow 32, of the water flow will pass through the annulus 28 formed between the convergent section 16 and the turbine tube 24. A smaller volume of water, the secondary flow 34, will flow through the turbine tube 24 driving the rotation of the turbine tube, as it flows past the blade assembly 30. As the primary flow 32 converges towards the venturi 20, the primary flow accelerates and loses static head. The high speed primary flow 32 outside the turbine tube 24 at the turbine tube exit assists in drawing the slower secondary flow 34 out of the end of the turbine tube 24 into the primary flow 32.

Thus the apparatus is able turn a high volume, low head flow into a low volume high-head flow from which electrical power can be generated efficiently via the rotating turbine tube.

Figure 4:
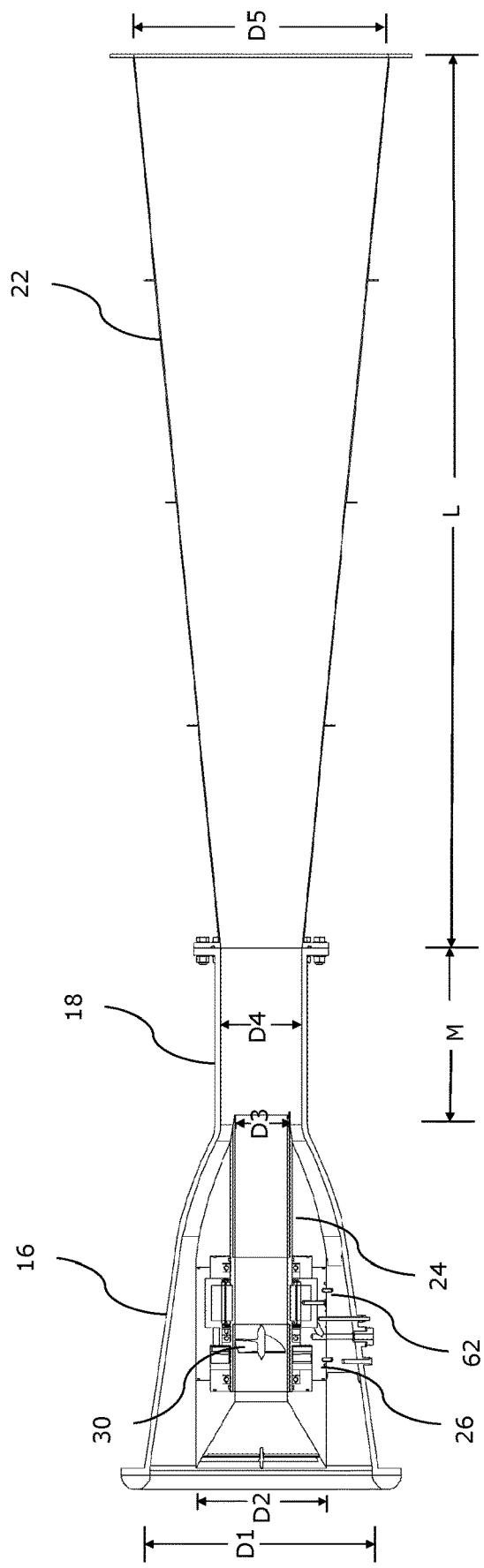
FIG. 4 shows a cross sectional side view of an embodiment of the invention.
Figure 5:
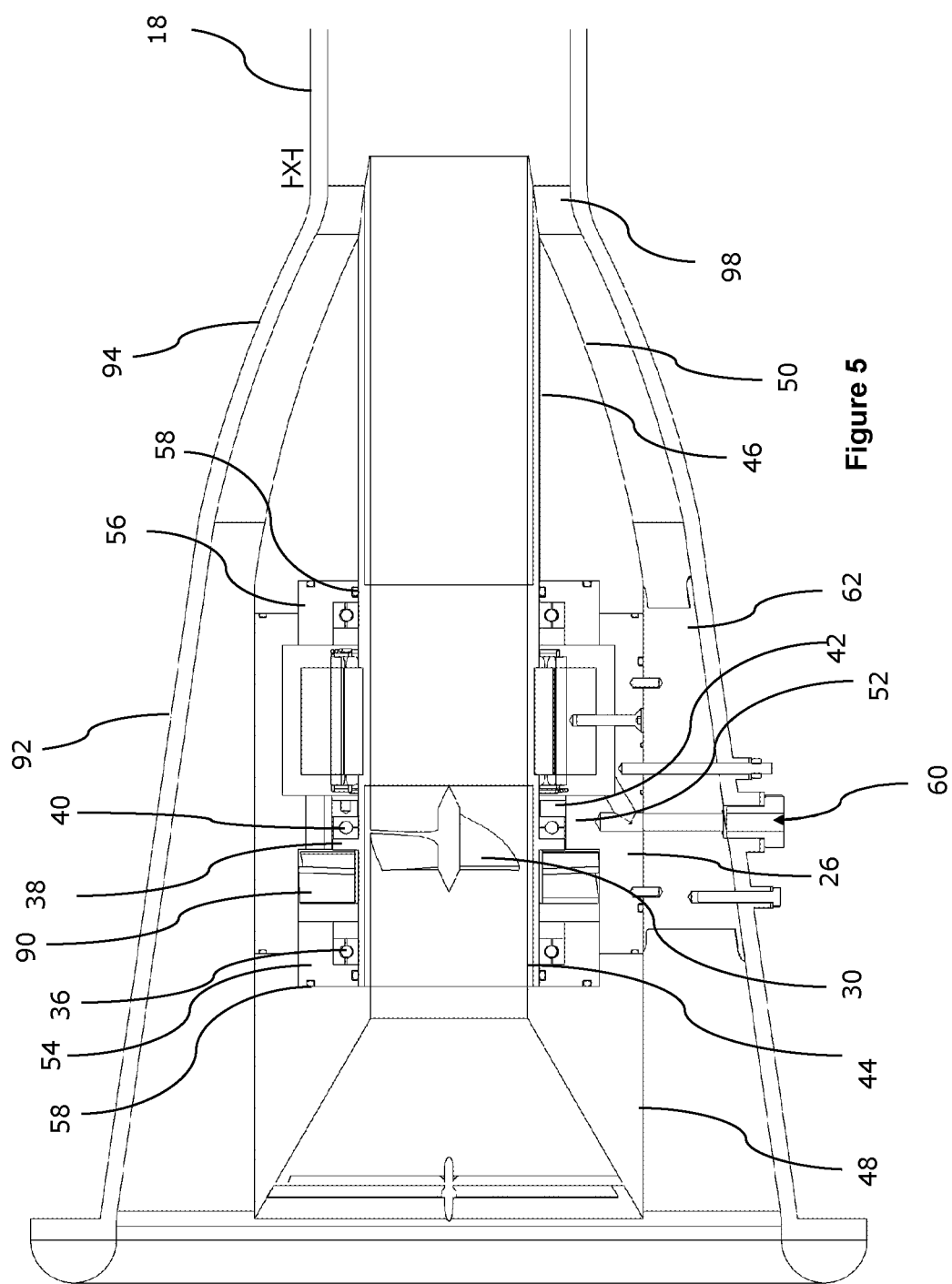
FIG. 5 shows a cross sectional side view of the convergent section and turbine tube of the invention

With reference to FIGS. 4 and 5 the turbine tube 24 is rotatably supported in the convergent section 16 in a static support boss 26 and is located centrally within the convergent section 16. The turbine tube 24 provides a flow path between the high static head upstream and the low static head in the venturi. The secondary flow passes through the turbine tube, induced by the amplified head drop between the upstream end of the turbine tube and the venturi.

A blade assembly 30 comprising a plurality of turbine blades is located inside the turbine tube 24. The blade assembly is connected to the internal surface of the turbine tube 24 via the tips of the blades such that as water flows past the blade assembly 30 the turbine tube 24 rotates about its central axis. The turbine tube and blade assembly rotate together as a single unit. As water flows past the blade assembly, the water flow interacts with the blades and this drives rotation of the turbine tube, which rotates on bearings in the support boss.

In one embodiment a plurality of recesses are machined into the inner surface of the turbine tube. Each blade has a land at its tip, shaped to fit into the recesses and fix the turbine blades relative to the turbine tube. The recesses are machined into the inner surface of the front end of the turbine tube and the blade tip lands can slide into recesses from the front end of the tube. This enables the blades to be removed and inserted from the front end of the turbine tube, if damaged or need replacing, without the need for substantial dismantling of the turbine tube.

In an alternative embodiment the blades tips are integral with the inner surface of the turbine tube.

There is no break in the turbine tube about the blade assembly and therefore no leakage path between the upstream and downstream faces of the blade assembly. The bearings 36, 40 on which the turbine tube 24 rotates are outside the turbine tube 24, segregated from the flow that passes through the blade assembly 30. Thus the high pressure drop across the turbine has no available bypass leakage path and all the secondary flow 34 goes through the length of the turbine tube 24.

The blade assembly can be provided a sufficient distance from the entrance of the turbine tube, i.e., the blade assembly is set-back from the entrance of the turbine tube, such that there is well-conditioned flow through the blade assembly. In one embodiment the blade assembly is provided along a part-length of the turbine tube, such that at least part of the secondary flow passage is provided before the blade assembly and at least part of the secondary flow passage is provided after the blade assembly.

By having the turbine tube and blades of the blade assembly rotate as a single unit within the support boss there is physical continuity from the blades to the tube, this helps eliminate power losses at the blade tips that can occur with a conventional turbine. This continuity of the blades to the turbine tube also helps enhance the structural strength and resilience of the blades and allows a smaller, lighter blade design to be used, which can help minimize power loss.

Figure 11:
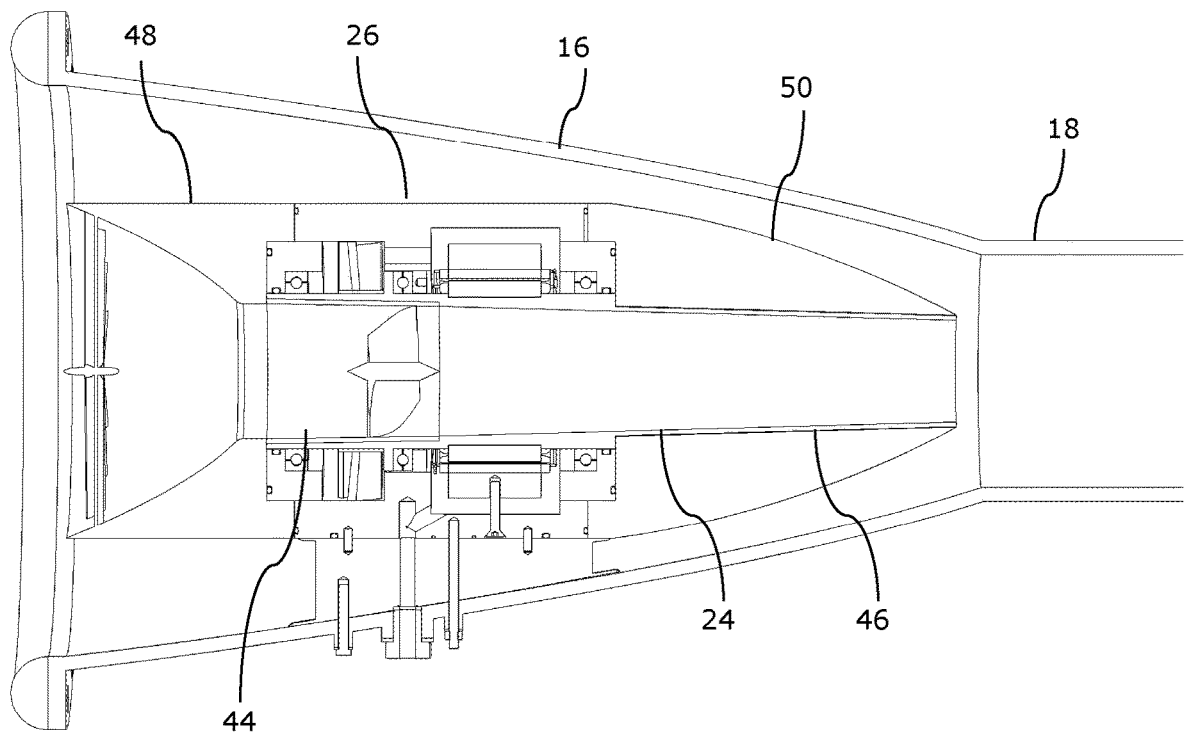
FIGS. 11 and 12 show schematic side views of the turbine tube of the invention.
Figure 12:
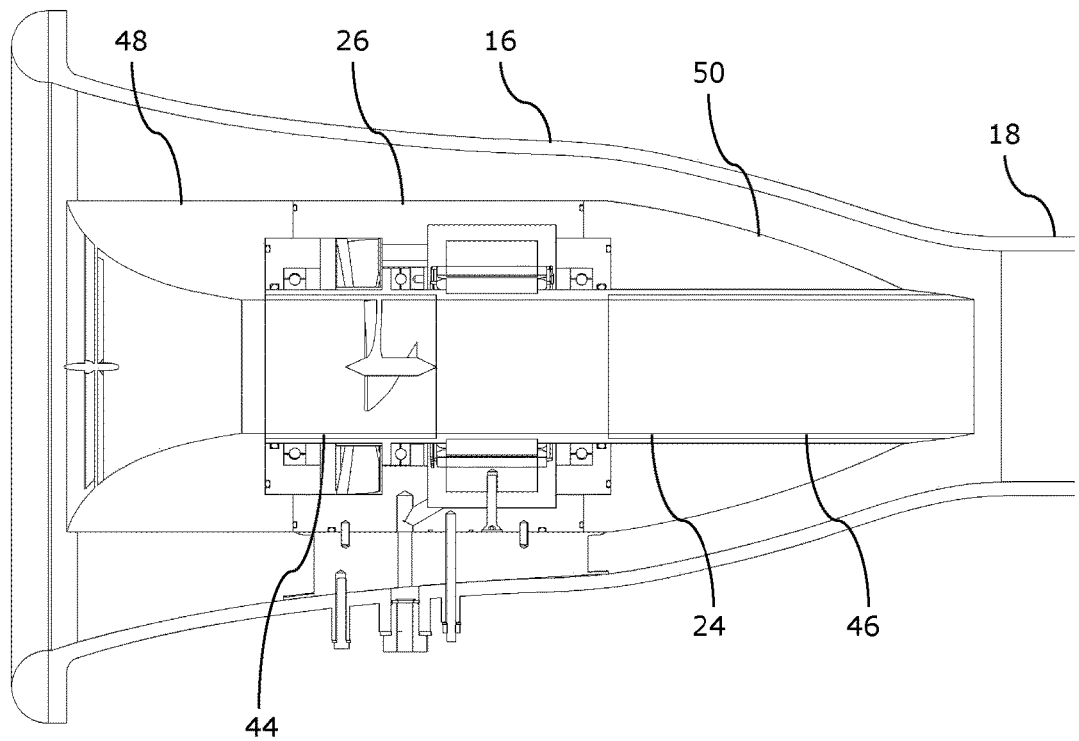

As shown in FIG. 12 the turbine tube 24 can have a substantially constant internal diameter along its length. In an alternative configuration the turbine tube 24 can taper towards its downstream end as shown in FIG. 11. The diameter of the turbine tube converges along its length such that the entrance of the turbine tube 24 has a larger diameter than the exit of the turbine tube. Providing a tapered turbine tube can help generate higher efficiencies for the apparatus from reduced skin friction.

In one embodiment the turbine tube 24 can comprise two or more sections. The turbine tube 24 can comprise a forward load bearing section 44 and an after section 46. The forward section and the after section can be made from different materials. Preferably the forward section is made from a stronger material than the after section. This can help reduce costs in the manufacture of the system by using a light and/or cheaper material in the after section. Suitable materials that can be used include but are not limited to, materials such as steel, titanium, aluminum, bronze and alloys thereof for the section made of the stronger material. Lighter and/or cheaper materials for the other section can include but are not limited to plastic or low cost metal alloys.

The sections forming the tube can be manufactured by conventional means. In some embodiments the forward section comprising the encastred turbine could optionally be manufactured by 3D printing.

The turbine tube can be of a length sufficient such that it is positioned in the convergent section to span from the high pressure zone area to the low pressure zone at the venturi. As shown in FIG. 5 the downstream end of the turbine tube 24 can be located within the mixing tube 18, extending into the mixing tube at a distance X. The distance X is selected to optimize the performance of the device and can be 0, positive or negative. When the distance X is positive the turbine tube extends into the mixing tube. When the distance X is negative the exit of the turbine tube terminates upstream of the entrance of the mixing tube. When the distance X is 0 the exit of the turbine tube is substantially in line with the entrance of the mixing tube.

The support boss 26 comprises a support tube having a central bore in which the turbine tube 24 is mounted in. The support boss is mounted in the convergent section 16 by support vanes 62.

The turbine tube 24 comprises a thrust flange 38 which extends circumferentially around the outer surface of the turbine tube 24. The thrust flange 38 on the turbine tube 24 engages with thrust bearings 40 which are restrained within the support boss 26 by a threaded thrust boss 42. The threaded thrust boss 42 extends circumferentially around the inner surface of the support boss 26. The engagement of the thrust flange with the thrust boss prevents the turbine tube from moving axially downstream as the turbine tube rotates.

In one embodiment the support boss 26 can comprise a nose fairing 48 and/or a tail fairing 50 which engage the support tube. The nose and tail fairings are shaped to present a smooth hydrodynamic profile to the primary flow when mounted on the support boss to help minimize energy loss due to turbulence. As shown in FIG. 5 the nose fairing can be cylindrical, or present as a bullet shaped profile as shown in FIGS. 15 to 18.

Figure 13:
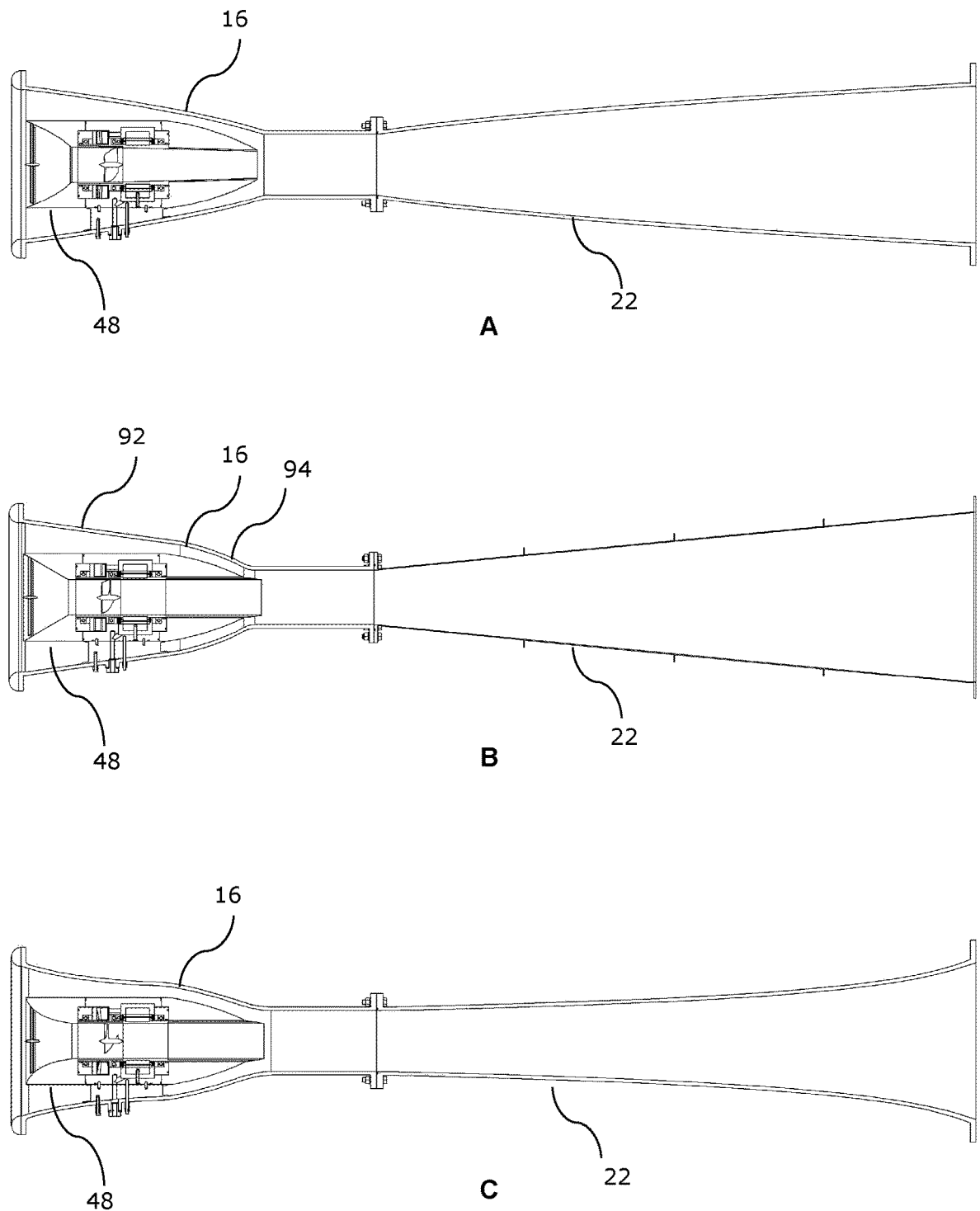
FIGS. 13 A, B and C show schematic side views of embodiments of the invention.

The nose fairing 48 provides an entrance shroud to the turbine tube 24, and defines the entrance for the secondary flow 34 into the turbine tube. The inner surface of the nose fairing is in contact with the secondary flow and can be shaped to help efficiency of the apparatus. FIG. 13 exemplifies some possible shapes of the inner surface of the nose fairing. As shown in FIG. 13A the inner surface of the nose fairing can have a concave shape. FIG. 13B shows an apparatus where the nose fairing has a conical shape with a constant taper from its entrance to the entrance of the turbine tube. FIG. 13C shows an apparatus where the nose fairing has a convex shape. In one embodiment the apparatus can further comprises a fish screen (not shown) connected to the entrance of the turbine tube. The fish screen is selected to allow water to still flow through the turbine tube whilst preventing fish from entering the tube. Rotation of the tube turbine can assist in keeping the fish screen free of debris.

Figure 14:
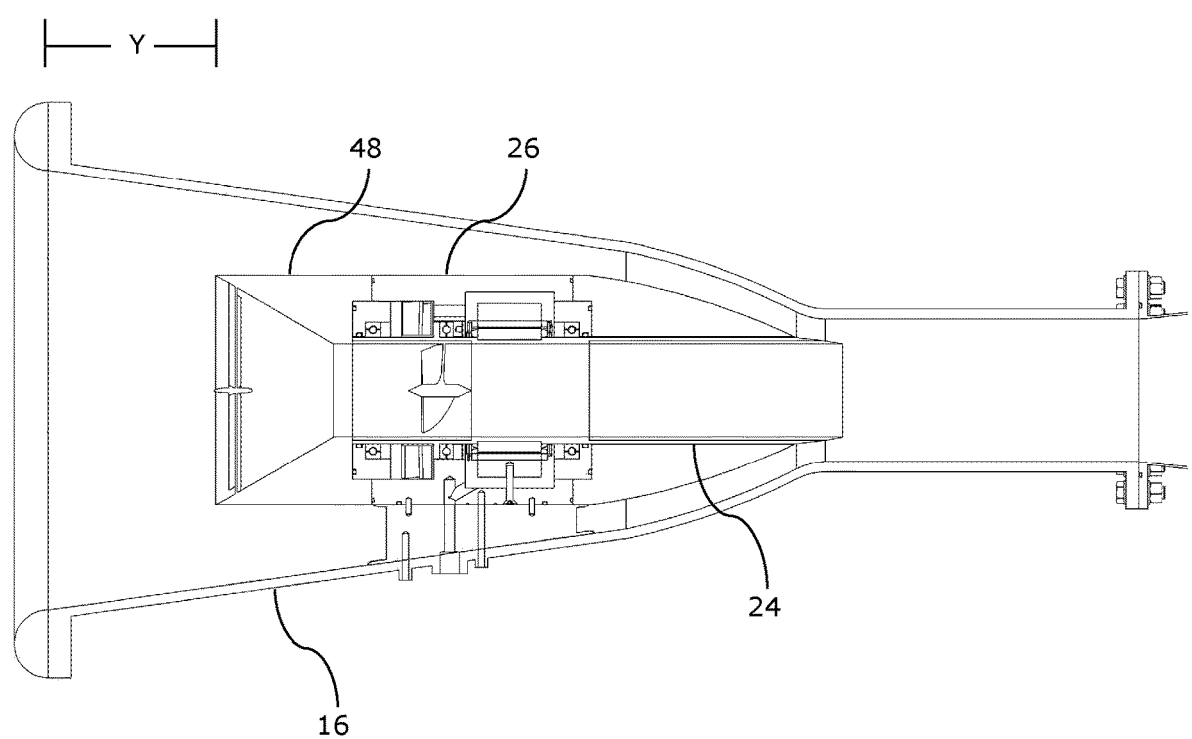
FIG. 14 shows a schematic side view of a turbine tube and convergent section of the invention.
Figure 15:
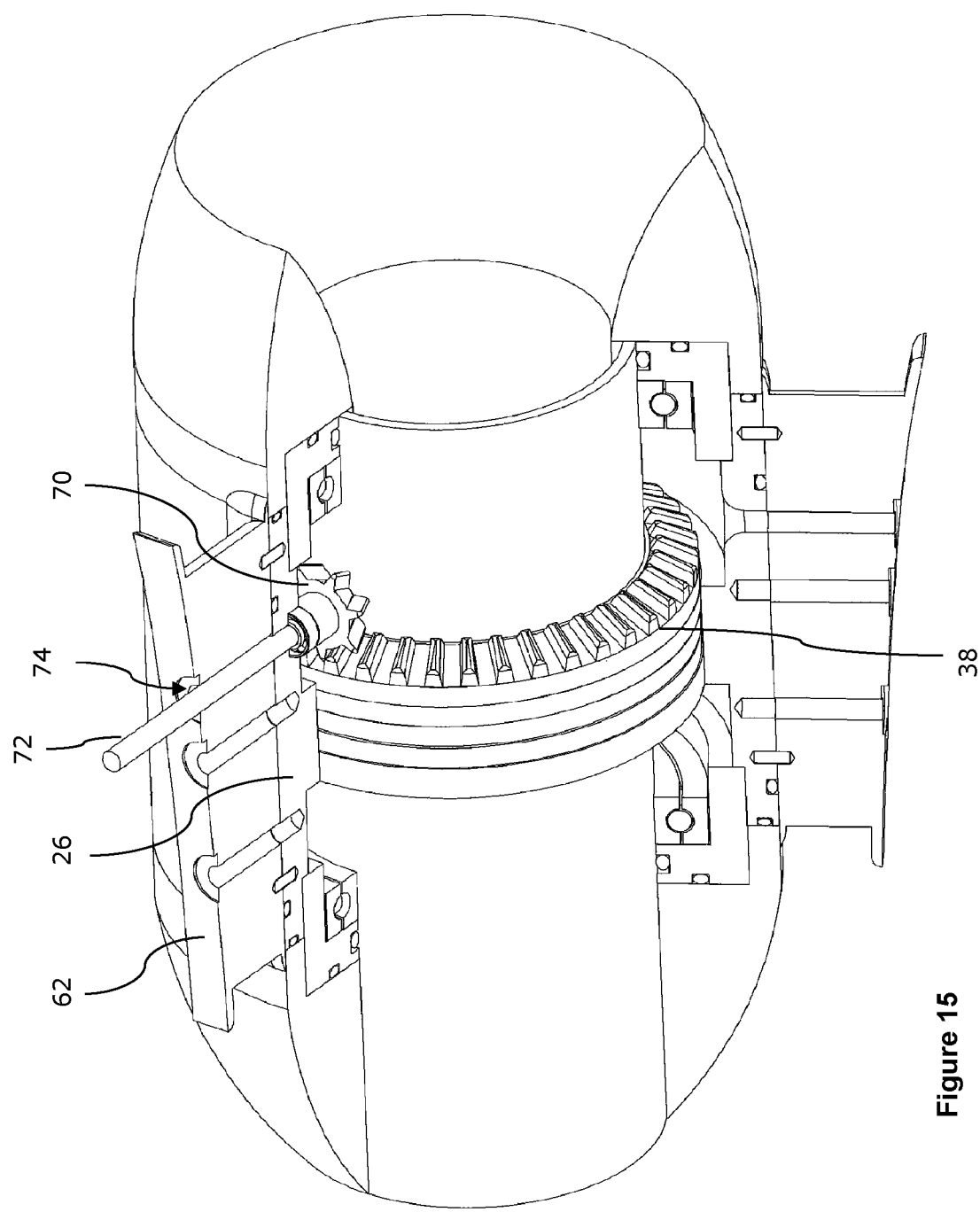
FIG. 15 shows a cut away view of the mechanical power generator of the invention.

As shown in FIG. 14 the upstream end of the nose fairing 48 of the support boss 26 is at a distance Y from the entrance of the convergent section 16. The distance Y can be zero, positive or negative. When the distance Y is positive the entrance of the convergent section is upstream of the entrance of the nose fairing of the support boss. When the distance Y is negative the entrance of the support boss is upstream of the entrance of the convergent section. When the distance Y is zero, the entrance of the convergent section is substantially in line with the entrance of the nose fairing of the support boss.

In one preferred embodiment where the free stream water velocity is less than 2 meters per second, distance Y is selected in conjunction with the size of D1 (diameter of the convergent entrance) to ensure that water passing the cross section of the convergent section that is aligned level with the leading edge of the nose fairing has an average velocity of approximately 2 meters per second.

Referring to FIG. 5 the support boss 26 comprises a raised internal circular land 52. The thrust flange 38 of the turbine tube 24 is engaged with the circular land 52 of the support boss. Power generation components are located in the space between the support boss 26 the turbine tube 24. Threaded end caps 54 and 56 close the end of the space between the turbine tube 24 and the support boss 26. The end caps 54 and 56 can carry bearings 36 on which the turbine tube 24 rotates about its longitudinal axis. Seals 58 are provided between the turbine tube 24 and the end caps 54, 56, between the end caps 54, 56 and the nose 48 and tail 50 fairings, and/or between the support boss 26 and the nose 48 and tail 50 fairings. The seals 58 help limit water entering the space between the support boss and the turbine tube.

The support boss and turbine tube are also configured such that there is little or no pressure differential between the entrances of the possible leakage paths leading from the secondary flow into the space between the turbine tube and support boss. This assists in inhibiting water leaking into the space.

Figure 8:
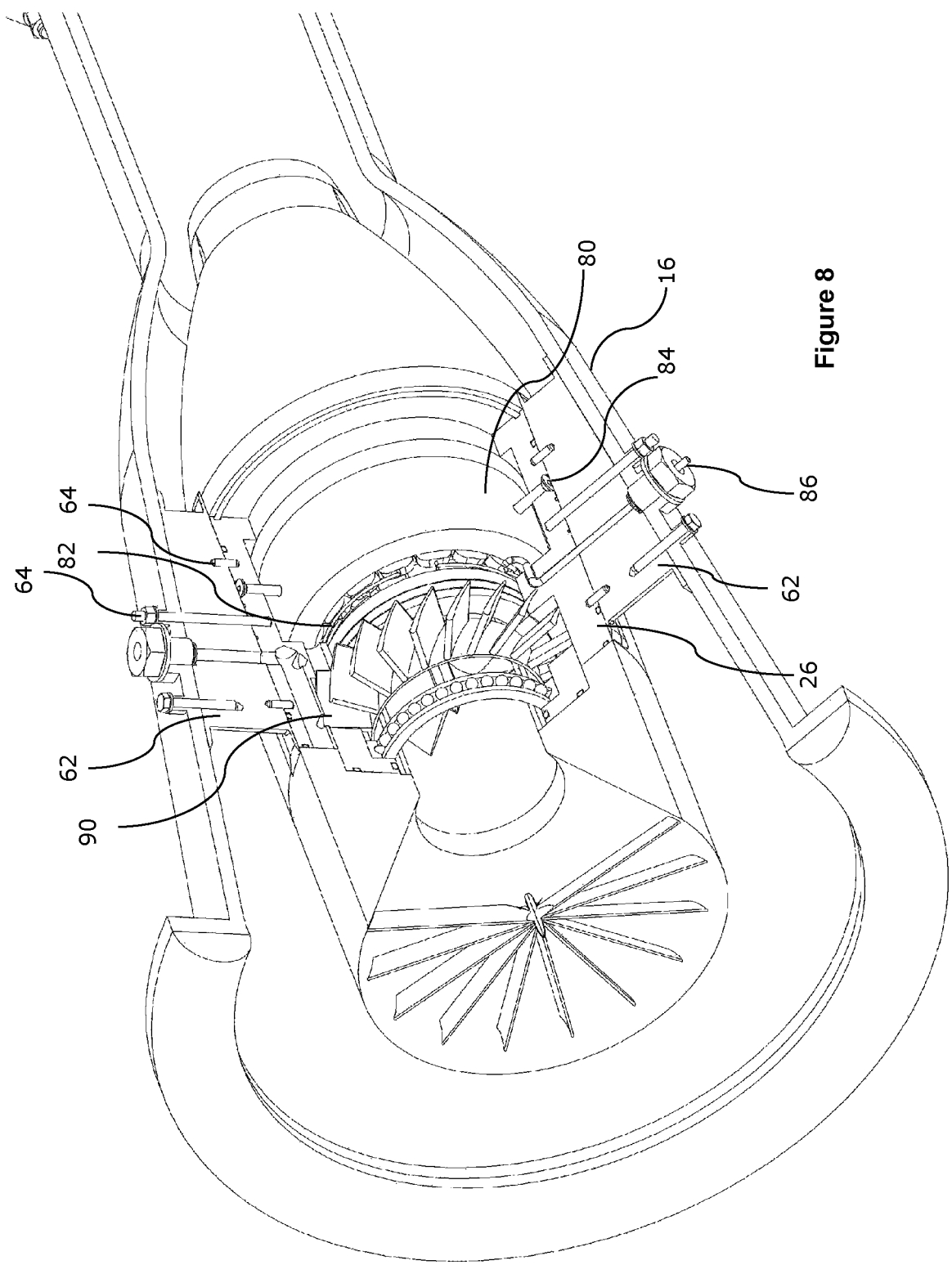
FIGS. 8 and 9 show cut away views of an embodiment of the turbine tube and support boss for use in the apparatus of the invention.

The support boss 26 is supported in the convergent section by two or more support vanes 62 extending from the outer surface of the support boss 26 to the inner surface of the convergent section 16. The number of the support vanes can vary, preferably 3 or 4 support vanes are used, however more or less support vanes can be used if required. The support vanes are profiled to minimize energy loss in the primary flow. The support vanes 62 are attached to the convergent section 16 and the support boss 26 with bolts 64 and/or dowels 66 as shown in FIG. 8. Other conventional attachment means can also be used to attach the support vanes to the convergent section and to the support boss.

In one embodiment the support boss 26 may comprise a drain conduit 60 extending through the support boss 26 and support vane 62 to outside the convergent section 18. If present, the drain conduit is positioned such that, in use the conduit 60 is aligned vertically downwards, and water that does enter the space between the support boss and the turbine tube can drain away, to outside the apparatus 14.

Figure 6:
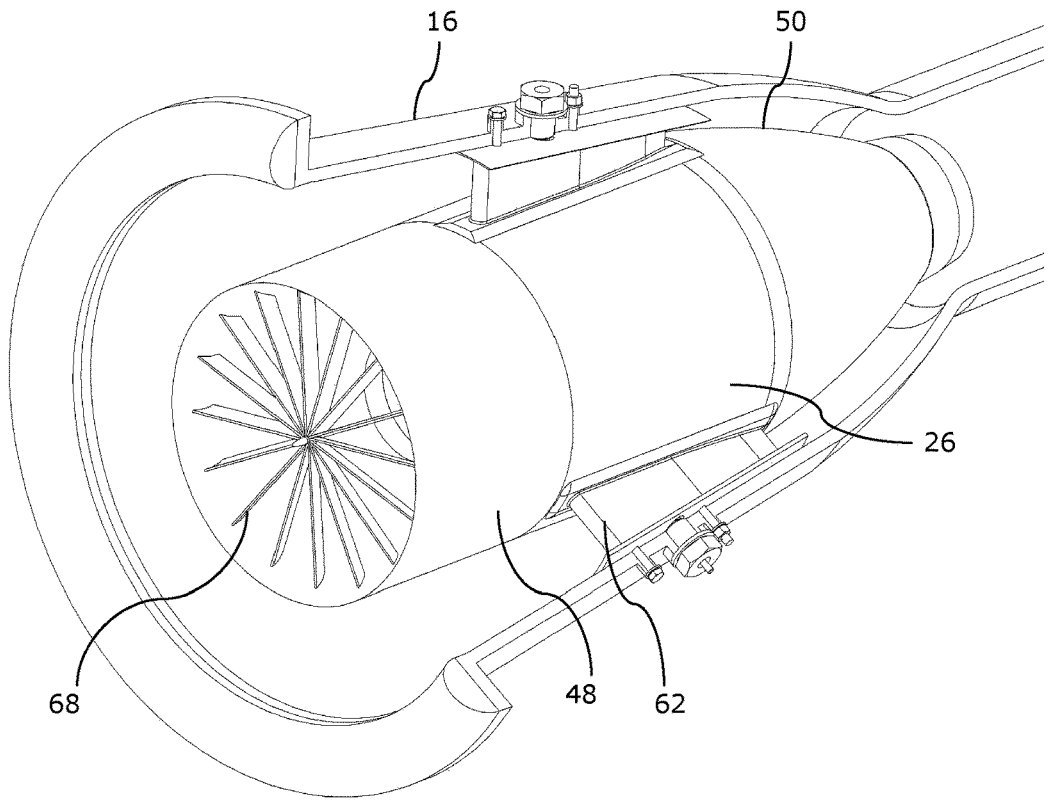
FIG. 6 shows a cut away view of a convergent section, turbine tube and support boss for use in the apparatus of the invention.
Figure 7:
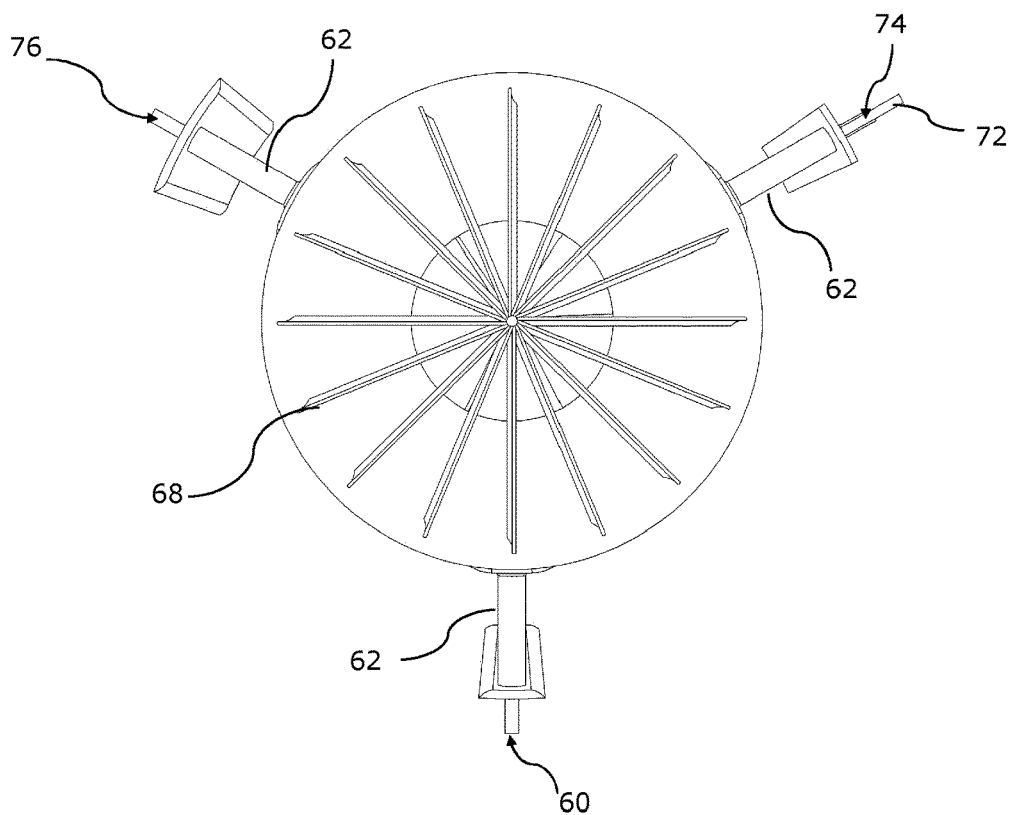
FIG. 7 shows an end view of turbine tube and support boss of the invention.

Rotation of the turbine tube will cause some rotational energy to pass into the primary flow through skin friction. In one embodiment as shown in FIGS. 6 and 7 any unwanted degree of rotation in the flow is countered by including a pre-swirl stator 68 in the nose fairing 48. The pre-swirl stator 68 can also help prevent ingress of large debris into the turbine tube.

Power generation components are located in the space between the support boss 26 the turbine tube 24. Two preferred power off take options for the apparatus are, a mechanical power off take arrangement and an electrical power off take arrangement.

A mechanical power off take arrangement is shown in FIGS. 15-18. The thrust flange 38 of the turbine tube 24 has gear teeth cut into its upstream side. Rotation of the turbine tube drives a gear train connected to the toothed thrust flange 38. The gear train comprises a toothed pinion wheel 70 located within the space between the support boss 26 and the turbine tube 24 and which engages with the toothed thrust flange 38. The pinion wheel 70 is connected to an end of a drive shaft 72. The drive shaft 72 extends up though a conduit 74 in the support boss 26 and support vane 62. Rotation of the turbine tube 24 results in rotation of the pinion wheel 70 and drive shaft 72. The drive shaft is connected to an alternator (not shown) located outside the apparatus 14 to generate electricity.

The apparatus may comprise one or more drive shaft 72 and pinion wheel 70 assemblies which engage with the toothed flange 38 of the turbine tube 24. High powered devices, where it can be desirable to limit stress in the power offtake components of the apparatus, can comprise a plurality of drive shaft/pinion wheel assemblies with each drive shaft 72 passing up through a conduit 74 in the support boss 26 and support vane 62.

Figure 16:
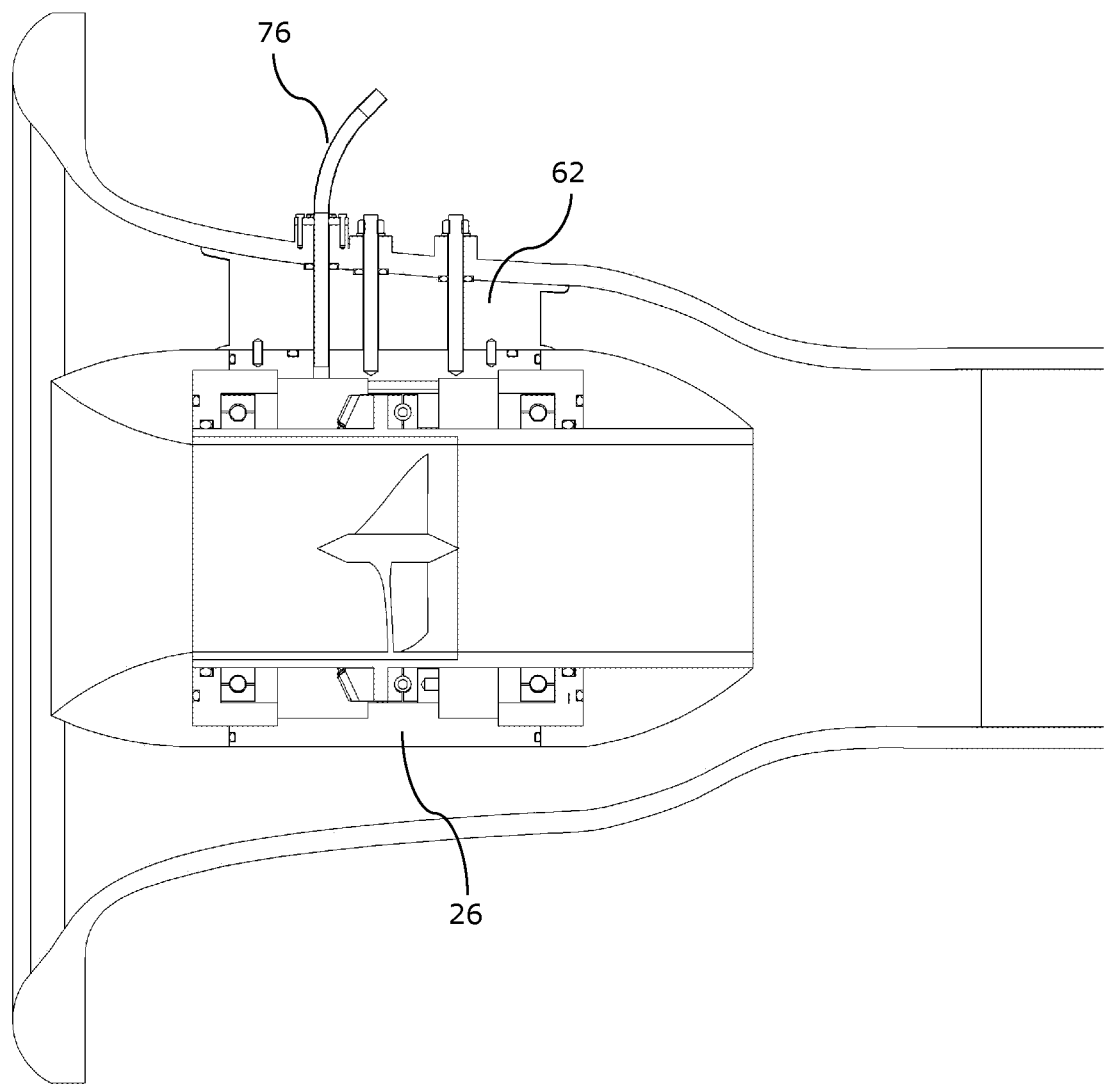
FIGS. 16, 17 and 18 show cross sectional side views of turbine tubes of the invention.
Figure 17:
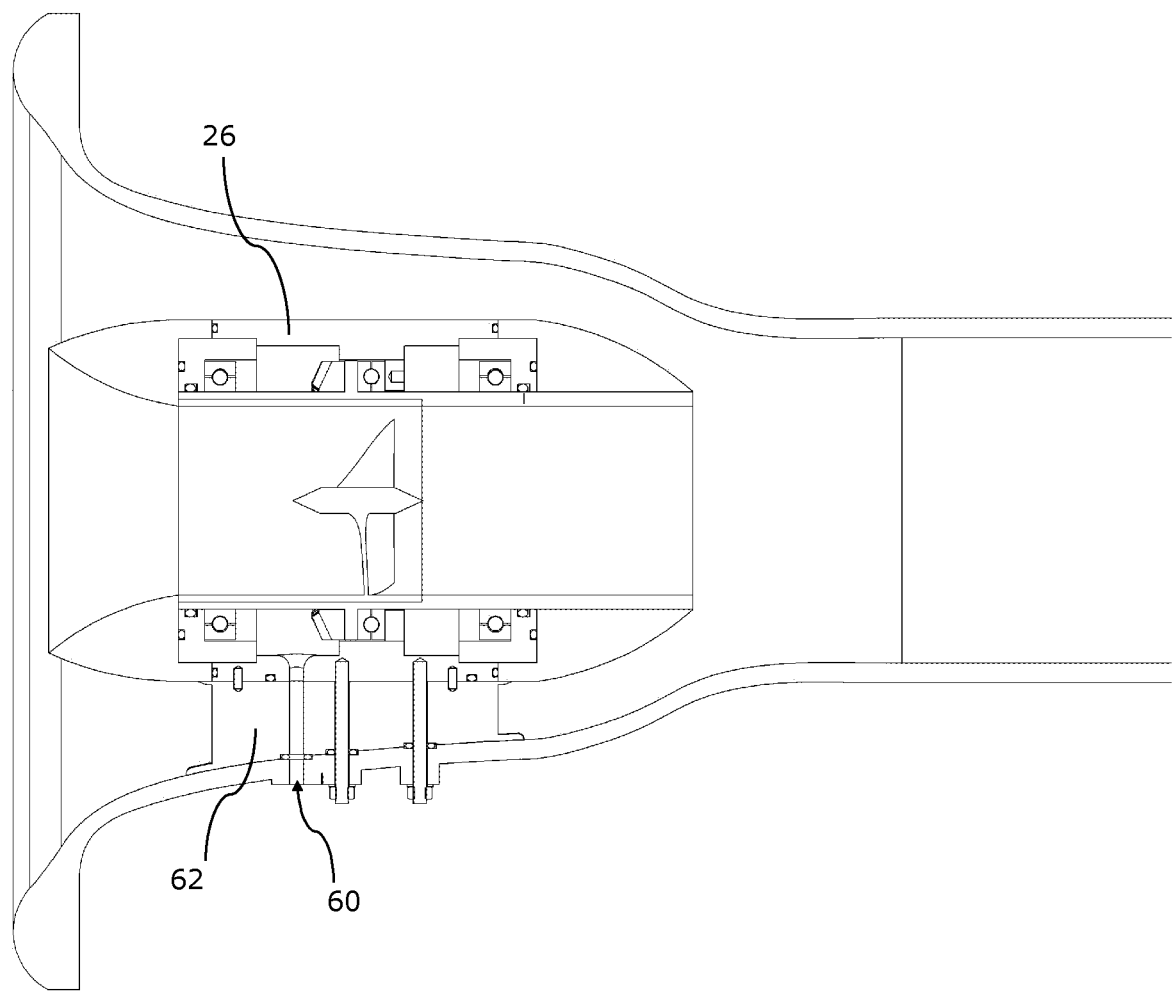
Figure 18:
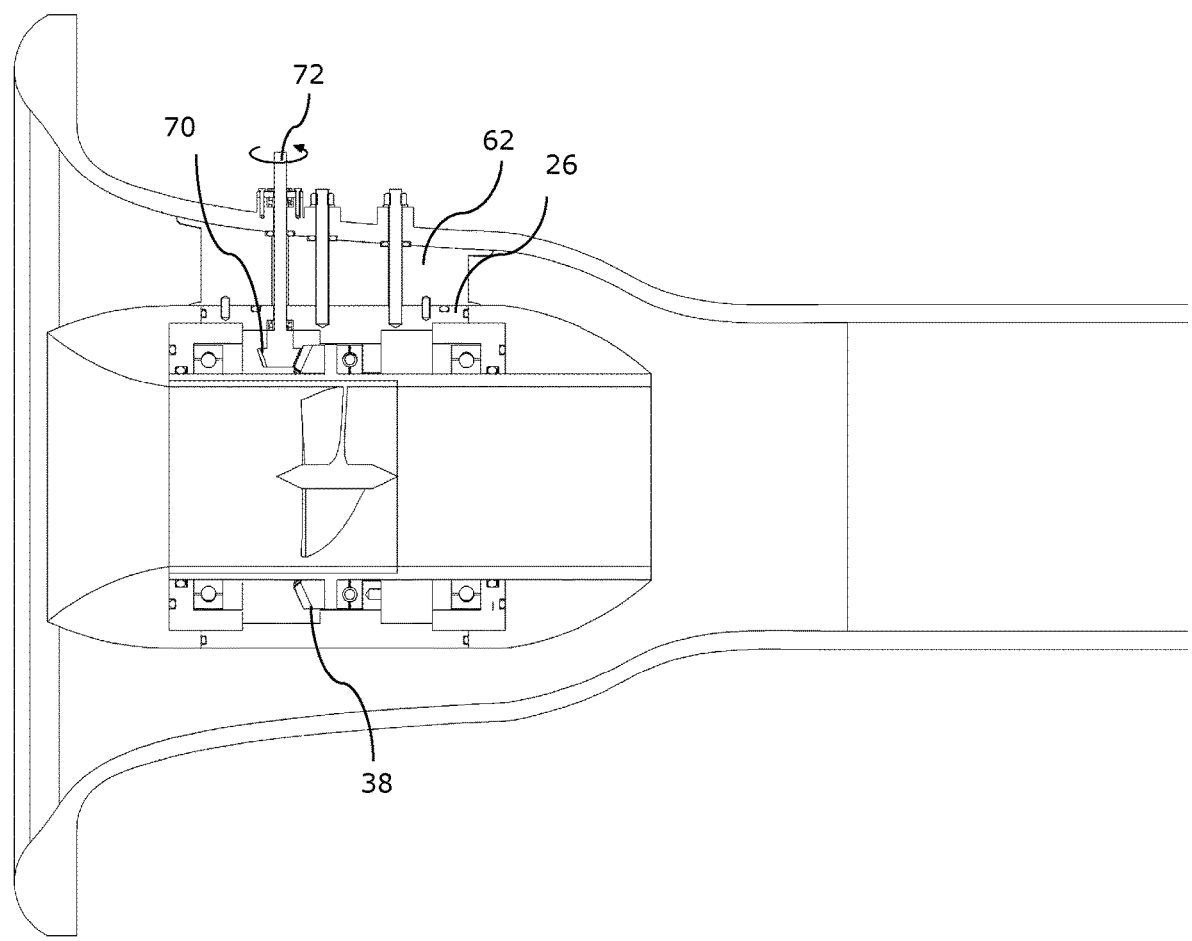

Referring to FIGS. 7 and 16 in one embodiment the apparatus comprises an air compressor (not shown) to inject air down a conduit 76 that extends through the support vane 62 and support boss 26 into the space between the support boss 26 and turbine tube 24. Injecting air down the conduit 76 helps discharge any water in the space between the support boss 26 and turbine tube 24, out the drain conduit 60. When present in an apparatus comprising a mechanical off take arrangement the air compressor can be driven by the drive shaft 72 of the gear train.

Removing water from the space which contains the bearings 36 and pinion wheel 70 helps minimize frictional drag on the drive train. When the apparatus is not operating any water that seeps into the space will flow out of the drain conduit 60 under gravity.

Figure 9:
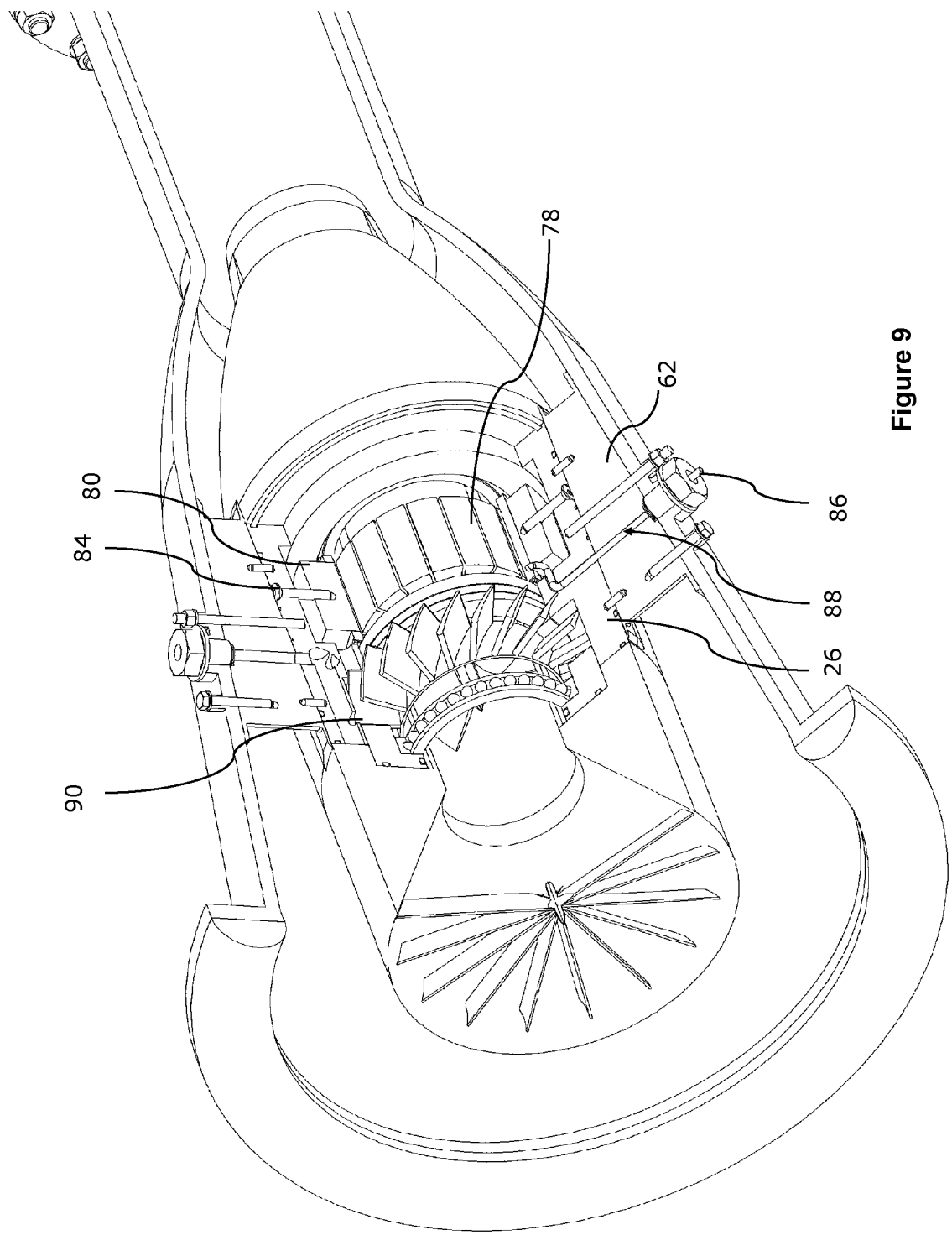
Figure 10:
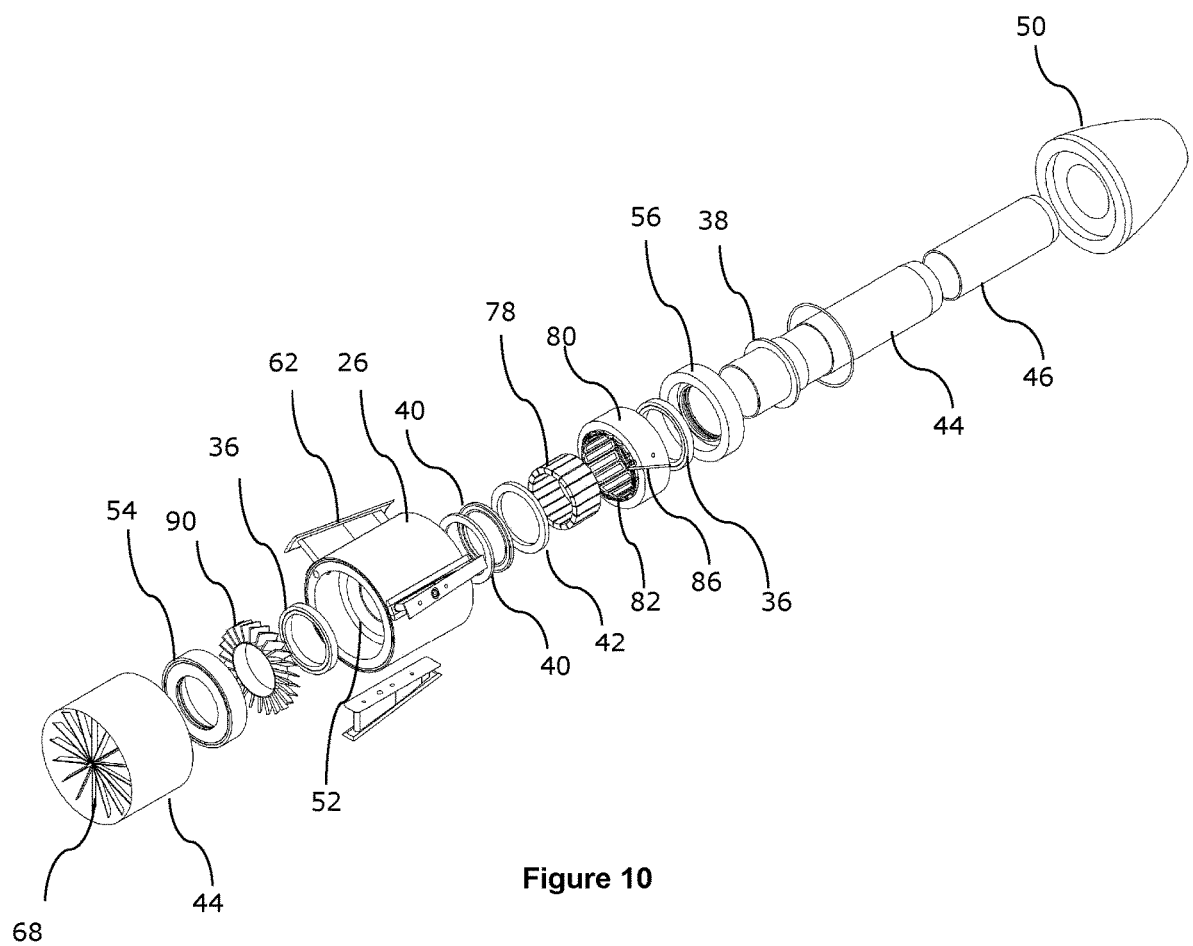
FIG. 10 shows an exploded view of an embodiment of the turbine tube and support boss.

An electrical power off take arrangement is shown in FIGS. 8, 9 and 10. Permanent magnets 78 are fixed into a groove machined into the outer surface of the turbine tube 24. The groove can be located in the load bearing portion 44 of the turbine tube 24. A stator 80 carries the primary windings 82 and is connected to the support boss 26. The stator 80 is held inside the support boss 26 by bolts 84 or other conventional attachment means.

Rotation of the turbine tube 24 causes the permanent magnets 78 to rotate inside the soft iron core stator 80 and primary windings 82, generating electrical power. The electrical power is exported from the apparatus via a power cable 86 through a conduit 88 that extends through the support boss 26 and support vane 62.

In one embodiment a blower fan 90 is fitted about the turbine tube 24. The fan is dimensioned such that rotation of the turbine tube causes the blower fan to draw air down the air conduit 76. The conduit extends through the support boss and support vane drawing air into the space between the support boss and the turbine tube immediately upstream of the blower fan. When present in an apparatus comprising an electrical off take arrangement the blower fan blows air under pressure into the space surrounding the stator.

The air pressure created around the stator 80 discharges any water in the space around the stator through the drain conduit 60. When the apparatus is not operating any water that seeps into the space will flow out via the drain conduit 60 under gravity.

The power off take from the turbine, either via a mechanical or an electrical arrangement, is made through a conduit extending through the support boss and support vanes. This means that the primary or secondary flows are not disturbed by drive belts or shafts, as would be the case in freely rotating turbines in a fixed tube.

The integrated constructions of the components forming the turbine tube and support boss helps reduce installation time and costs, and help site positioning of the apparatus.

The convergent section 16 is in the form of a funnel having a first opening as an entrance for receiving water from behind the barrier 12 at one end and a narrower opening as an exit at the opposite end to release water into the mixing tube 18. The convergent section 16 tapers down from the upstream end towards the entrance of the mixing tube 18. A venturi 20 is defined at the boundary of the convergent section and mixing tube. The parameters of the convergent section, such as the angle of convergence, the length the section, and the size, such as the diameters of the entrance and exit of the convergent section, can be selected to optimize the performance of the apparatus.

Referring to FIG. 13 as shown in FIG. 13A the convergent section 16 has a substantially conical profile from the upstream end to the downstream end. The convergent section can be simply manufactured as a single piece in the shape of a conical frustum. FIG. 13B and FIG. 5 exemplify an alternative configuration where the convergent section 16 comprises a forward convergent section 92 and after convergent section 94. The forward and after convergent sections can be manufactured separately with the forward convergent section having a simple shape as a conical frustum and the after convergent section a more complex curved convex shape. FIG. 13C exemplifies a further preferred alternative configuration where convergent section 16 tapers at a variable angle along its length to provide a convex type outer profile shaped to produce a constant acceleration to the primary flow 32 through the annulus.

The mixing tube provides a section in the pipe in which the secondary flow 34 and primary flow 32 can combine to form a substantially uniform flow. The flow is substantially homogenous before exiting the mixing tube 18 into the diffuser section 22 with a velocity profile that allows sufficient pressure recovery in the flow through the diffuser section to sustain the pressure difference between the low pressure at the venturi and the higher pressure at the exit of the diffuser section.

The mixing tube is configured to maximize the power output of the turbine tube through which the secondary flow 34 passes. This is achieved, at least in part, by the mixing section being configured to optimize the flow regimes in the region immediately downstream of the point where the secondary flow through the turbine induced by the low pressure in the venturi starts to co-mingle with the primary flow. The mixing tube is configured to optimize the energy transfer from the primary flow into the secondary flow in this mixing tube.

The mixing tube has an opening, an exit and non-zero length to provide a space of sufficient length in between the opening and the exit in which the flows can mix. The length (L) of the tubing defining the mixing tube is selected such that an appropriately conditioned flow is obtained before the flow enters the diffuser section. Selecting the correct length for the flow and pressure conditions ensures that there is optimum energy transfer between the fast moving primary flow and the slower secondary flow, such that there is an acceptable velocity profile across the two flows before the combined flows enters the diffuser section.

In one embodiment of the invention the mixing tube can taper in the downstream direction by a half cone angle of β, beta, such that the exit of the mixing tube is narrower than its entrance. The half cone angle of the mixing tube can be positive or negative. In an alternative embodiment the mixing tube can taper in the upstream direction such that the exit of the mixing tube is wider than the entrance of the mixing tube, i.e., the mixing tube diverges along its length towards the diffuser section. Having a tapered mixing tube can facilitate the energy transfer between the higher speed primary flow through the annulus and the slower secondary flow exiting the turbine tube.

The downstream end of the mixing tube 18 is connected to the diffuser section 22. The diffuser section is in the form of a funnel having a first opening as an entrance for receiving water from the mixing tube 18 and a wider opening as an exit at the opposite end to release water back into the free flow on the downstream side of the barrier 12. The diffuser section 22 diverges outwardly from the exit of the mixing tube 18 to slow the flow down and recover static pressure before it exits the diffuser section 22 and to minimize energy loss through turbulence. The angle of diversion can be selected to optimize the performance of the diffuser.

The parameters of the diffuser section, such as the length of the section, angle of divergence, θ, and the ratio of the cross sectional area of the first and second openings are selected to suppress turbulence and to reduce energy losses caused by flow breakaway, as the flow decelerates back down to the free stream velocity. Undue turbulence, eddies and flow breakaway can impair pressure recovery as the flow approaches the exit of the diffuser section. The parameters are selected to maximize pressure recovery such that the pressure at the diffuser exit, which is set by the downstream water depth, is as high as possible above the pressure at the venturi.

The diffuser section is configured to provide the primary flow with a constant rate of deceleration through the diffuser section as pressure recovery occurs. Referring to FIGS. 13A and 13C the diffuser section 22 diverges to the downstream end at varying angles along its length. As shown in FIG. 13A the diffuser section can have a concave type outer profile. As shown in FIG. 13C the diffuser section can have a convex type outer profile section. FIG. 13B exemplifies an apparatus having a divergent section 22 which tapers at a substantially constant angle, to have a substantially conical profile.

The convergent section, mixing tube and diffuser section can be manufactured as a single continuous tube. Alternatively the convergent section, mixing tube and diffuser section can be manufactured as two more separate sections held together by bolts or by other conventional joining means or techniques. As shown in FIGS. 2 and 3 the convergent section, mixing tube and diffuser section can be manufactured as two sections, a convergent and mixing tube section and a diffuser section, with the two sections held together by bolts 96.

Radiused transitions 98 can be formed between any two adjacent sections to minimize energy losses due to induced turbulence that may occur if sharp edge transitions between the sections are present. This will help enhance the energy conversion efficiency of the system.

The apparatus can be used to generate power outputs from 1 kW to over 1 MW. Referring to FIG. 4 the diameter of the entrance of the convergent section (D1), the diameter of the entrance of the nose fairing of the support boss (D2), the diameter of the exit of the turbine tube (D3), the diameter of the exit of the mixing section (D4), the diameter of the exit of the diffuser section (D5), the length "M" of the mixing section, and the length "L" of the diffuser section can be varied to help enhance efficiency of the system. The ratios D4/D1, D3/D1, M/D4 and L/(D5−D4) will be selected to suit the conditions where the system is to be installed.

In one embodiment the device is designed such that approximately 80% of the water flow passes through the annulus 28 and the remaining approximately 20% of water flow is drawn through the turbine tube 24. In one preferred embodiment the apparatus is configured such that the product of two non-dimensional parameters α (alpha) and β (beta) is approximately equal to 0.25, where:

α is the ratio of the total primary flow area at the exit of the turbine tube $[(\pi/4)(D4^2-D3^2)]$ to the total secondary flow area at the exit of the turbine tube $(\pi D3^2/4)$; and β is the ratio of the mean velocity of the secondary flow in the turbine tube to the mean velocity of the primary flow in the annulus at the exit from the turbine tube.

Unlike kinetic energy machines in a free fluid stream, wherein the maximum power of any such machine is subjected to the Betz limit, and an array of such machines requires them to be placed with a significant separation between each machine, this invention first creates an inventory of potential hydraulic energy from the kinetic energy of the entire flow by raising the upstream water level due to the provision of the barrier across the entire width of the body of water and then concentrates much of this inventory of potential energy into the smaller part of the flow passing through the turbine tube and across which is a correspondingly amplified pressure drop is created, permitting electrical energy to be generated at an economic "water to wire" efficiency.

To achieve acceptable efficiencies in generating power the current invention allows the use of a blade assembly and turbine tube with a smaller diameter than the diameter of a turbine disc of a free stream turbine placed across the same body of flowing water. In many sites, including most rivers and many tidal estuary sites, the desirable diameter of a free stream turbine can significantly exceed the available water depth. A smaller turbine as can be used with the system of the invention to achieve equivalent efficiencies at lower capital cost and the system is suitable to be used in a greater range of sites.

The free surface of the upstream water behind the system of the invention is uplifted over the whole width of the flow, typically, by 1.0 m to 3.5 m. For free stream turbines, there will be a small "bulge" on the water surface above the turbine, caused by the resistant of the of the turbine to the flow of water, and which is a measure of the energy generating capacity of that free stream turbine. This bulge is typically undetectable by normal sight. The uplift just upstream of a free surface turbine is almost imperceptible because of the constraints of the Betz Limit. Furthermore, this small uplifted volume is local to each free stream turbine in plan and the Betz Limit also prescribes significant open water between each free stream turbine in an array so that the volume of uplifted water above and just upstream of a free stream turbine or turbine array is radically smaller than that uplifted upstream of this invention placed across the same flowing body of water, typically by an order of magnitude or more. This comparison of volumes of uplifted water is a direct measure of the comparative energy available for conversion into electricity by each type of machine. The system of the invention therefore typically has an order of magnitude or more energy available to it than a free stream turbine or free stream turbine array has from the same body of water.

Furthermore, the invention creates a much larger water head uplift upstream than would deployment of a free stream turbine and then, typically amplifies that head difference further by a factor of 3 to 5 times in the induced secondary flow which is typically 20% of the upstream flow. So the driving head (pressure) of the turbine in the invention is greater than that across a free stream turbine, typically by an order of magnitude or more. This apparatus of the invention can therefore use a turbine tube and blade assembly with a diameter that is smaller by an order of magnitude or more, and rotates at a speed that is higher by an order of magnitude or more, than a typical free stream turbine.

A typical hydropower dam, where a barrier across a source of water channels all the flow of water through of turbine requires a head difference of typically 3.5 m or more to make the generator work efficiently. However because of the pressure amplification in the induced secondary flow the invention can operate such a turbine cost-effectively at head differences of around 1.0 m.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for generating electricity from water flow comprising:
    a mixing tube having a first end and a second end opposite the first end;
    a convergent section connected to the first end of the mixing tube such that a venturi is defined between the end of the convergent section and the mixing tube;
    a diffuser section connected to the second end of the mixing tube, the diffuser section configured such that, in use, the pressure at an exit of the diffuser section is greater than the pressure at the venturi;
    a turbine tube comprising a blade assembly having a plurality of blades, the turbine tube supported in the convergent section such that an annulus is defined between the turbine tube and the convergent section to form a first flow passage for a primary flow, and the turbine tube defining a second flow passage for a secondary flow through an interior of the turbine tube, wherein the turbine tube is rotatably mounted in the convergent section and the blades are attached to an inner surface of the turbine tube such that in use water flow past the blades drives the rotation of the turbine tube, and wherein the mixing tube is configured such that in use the primary flow mixes with the secondary flow in the mixing tube to form a mixed flow that enters the diffuser section, wherein the turbine tube is rotatably mounted in a support boss, the support boss mounted in the convergent section by support vanes; and
    a blower fan located radially about the turbine tube, to draw air into a space between the turbine tube and support boss via a conduit that extends through one of the support vanes.

2. The apparatus according to claim 1 wherein the support boss comprises a support tube of shorter length than the turbine tube.

3. The apparatus according to claim 2 wherein the support boss comprises end caps at either end of the support tube, the end caps having bearings on which the turbine tube can rotate.

4. The apparatus according to claim 1 wherein the turbine tube comprises a thrust flange which extends circumferentially around the outer surface of the turbine tube and the support boss comprises a thrust boss which extends circumferentially around the inner surface of the support boss, wherein the thrust flange engages with the thrust boss via a bearing assembly.

5. The apparatus according to claim 1 wherein the turbine tube drives a mechanical generator.

6. The apparatus according to claim 5 wherein the turbine tube comprises a toothed flange on its outer surface which engages with at least one pinion gear located in a space between the support boss and turbine tube, each pinion gear connected to a drive shaft, wherein the drive shaft is connectable to a generator.

7. The apparatus according to claim 6 comprising at least three pinion gear and drive shaft arrangements, each pinion gear engaging the toothed flange.

8. The apparatus according to claim 1 wherein the turbine tube drives an electrical generator.

9. The apparatus according to claim 8 wherein the turbine tube comprises permanent magnets in a recess on the outer surface of the turbine tube and the support boss comprise a stator aligned with the permanent magnets.

10. The apparatus according to claim 1 comprising a power off take conduit extending through the support boss and one of the support vanes.

11. The apparatus according to claim 1 comprising an air compressor to inject air into the space between the turbine tube and support boss via a conduit that extends through one of the support vanes.

12. The apparatus according to claim 1 comprising a downwardly extending drain conduit extending from the support boss to outside the convergent section through the support vane.

13. The apparatus according to claim 1 wherein the support boss comprises a nose fairing and/or a tail fairing.

14. The apparatus according to claim 13 wherein the outer profile of the nose fairing is cylindrical or bullet shaped.

15. The apparatus according to claim 13 wherein the inner profile of the nose fairing has a concave, conical or convex shape.

16. The apparatus according to claim 1 wherein the blades are integral with the inner surface of the turbine tube.

17. The apparatus according to claim 1 wherein the turbine tube comprises a first section made from a first material and a second section made from a second material, wherein the first and second materials are different.

18. The apparatus according to claim 17 wherein the first material is a stronger material than the second material.

19. The apparatus according to claim 1 wherein the internal diameter of the turbine tube decreases in the water flow direction.

20. The apparatus according to claim 1 wherein the turbine tube has a substantially constant internal diameter.

21. The apparatus according to claim 1 wherein the turbine tube is positioned such that entrance of the convergent section is upstream of the entrance of the turbine tube.

22. The apparatus according to claim 1 wherein the turbine tube is positioned such that the entrance of the turbine tube is upstream of the entrance of the convergent section.

23. The apparatus according to claim 1 further comprising a pre-swirl stator located at the entrance of the second flow passage.

24. The apparatus according to claim 1 wherein the turbine tube is positioned such that the exit of the turbine tubes extends into the mixing tube.

25. The apparatus according to claim 1 wherein the turbine tube is positioned such that the exit of the turbine tube is upstream of the entrance of the mixing tube.

26. The apparatus according to claim 1 wherein the convergent section, the mixing tube and the diffuser section are constructed as a continuous tube.

27. The apparatus according to claim 1 wherein the convergent section, the mixing tube and the diffuser section are constructed as discrete sections connected together to form a continuous tube.

28. A system for generating electricity from water flow comprising; a barrier for locating across the cross-section of a flowing body of water; and provided with at least one apparatus according to claim 1, wherein the at least one apparatus is positioned such that in use provides a flow path from the upstream side of the barrier to the downstream side of the barrier.

* * * * *